(12) United States Patent
Schultz et al.

(10) Patent No.: US 10,439,908 B2
(45) Date of Patent: *Oct. 8, 2019

(54) METHODS AND APPARATUS FOR PROVIDING ADAPTIVE PRIVATE NETWORK CENTRALIZED MANAGEMENT SYSTEM TIME CORRELATED PLAYBACK OF NETWORK TRAFFIC

(71) Applicant: Talari Networks Incorporated, San Jose, CA (US)

(72) Inventors: Adam Phillip Schultz, Morrisville, NC (US); Robert A. Coleman, Jr., Raleigh, NC (US); Christopher W. Parsons, Apex, NC (US); Todd Martin, Campbell, CA (US)

(73) Assignee: Talari Networks Incorporated, San Jose, CA (US)

( * ) Notice: Subject to any disclaimer, the term of this patent is extended or adjusted under 35 U.S.C. 154(b) by 83 days.

This patent is subject to a terminal disclaimer.

(21) Appl. No.: 15/728,684

(22) Filed: Oct. 10, 2017

(65) Prior Publication Data

US 2018/0062956 A1    Mar. 1, 2018

Related U.S. Application Data

(63) Continuation of application No. 14/973,343, filed on Dec. 17, 2015, now Pat. No. 9,813,315.

(Continued)

(51) Int. Cl.
*H04L 12/26* (2006.01)
*H04L 29/06* (2006.01)
*H04L 12/24* (2006.01)

(52) U.S. Cl.
CPC ............ *H04L 43/067* (2013.01); *H04L 41/12* (2013.01); *H04L 63/0823* (2013.01); *H04L 43/0817* (2013.01); *H04L 43/10* (2013.01)

(58) Field of Classification Search
CPC ....................................................... H04L 41/12
See application file for complete search history.

(56) References Cited

U.S. PATENT DOCUMENTS 3,789,653 A   2/1974  Brejaud
5,121,383 A   6/1992  Golestani
(Continued)

OTHER PUBLICATIONS

Examine's Answer for U.S. Appl. No. 14/972,353 (dated Oct. 18, 2018).

(Continued)

*Primary Examiner* — Guang W Li
(74) *Attorney, Agent, or Firm* — Jenkins, Wilson, Taylor & Hunt, P.A.

(57) ABSTRACT

System and techniques are described for time correlated playback of traffic patters between nodes in a network. Node statistics of data transfers between nodes are received in a control point, wherein the node statistics include a time stamp ($t_n$) according to time at the control point of when a request statistics message was sent to each node, a node timestamp ($t_a$) according to time at each node of when the message was received in the node, and a first delta between $t_n$ and $t_a$ that is used to determine a second delta which adjusts the node statistics. The node statistics adjusted according to the second delta are stored in a statistics database at the control point. A time stepping mechanism is used to repeatedly access the node statistics from the statistics database at a predetermined rate for playback presentation beginning from a specified start time to a specified end time.

19 Claims, 15 Drawing Sheets

Related U.S. Application Data

(60) Provisional application No. 62/096,049, filed on Dec. 23, 2014, provisional application No. 62/096,071, filed on Dec. 23, 2014, provisional application No. 62/096,086, filed on Dec. 23, 2014, provisional application No. 62/132,625, filed on Mar. 13, 2015, provisional application No. 62/132,987, filed on Mar. 13, 2015, provisional application No. 62/133,071, filed on Mar. 13, 2015, provisional application No. 62/133,094, filed on Mar. 13, 2015, provisional application No. 62/187,516, filed on Jul. 1, 2015.

(56) References Cited

U.S. PATENT DOCUMENTS

| | | | |
|---|---|---|---|
| 6,262,996 | B1 | 7/2001 | Kainulainen et al. |
| 6,490,405 | B1* | 12/2002 | Speed ............... H04N 5/926 348/E7.069 |
| 6,738,582 | B1 | 5/2004 | Moshe et al. |
| 6,894,972 | B1 | 5/2005 | Phaal |
| 7,036,049 | B2 | 4/2006 | Ali et al. |
| 7,542,485 | B2 | 6/2009 | Bingham et al. |
| 8,125,907 | B2 | 2/2012 | Averi et al. |
| 8,274,891 | B2 | 9/2012 | Averi et al. |
| 8,452,846 | B2 | 5/2013 | Fredette et al. |
| 8,644,164 | B2 | 2/2014 | Averi et al. |
| 8,775,547 | B2 | 7/2014 | Fredette et al. |
| 9,407,733 | B1 | 8/2016 | Mizrahi |
| 9,813,315 | B2 | 11/2017 | Schultz et al. |
| 10,320,635 | B2 | 6/2019 | Martin et al. |
| 2003/0115508 | A1 | 6/2003 | Ali et al. |
| 2005/0094567 | A1 | 5/2005 | Kannan et al. |
| 2006/0271670 | A1 | 11/2006 | Blomquist et al. |
| 2009/0119630 | A1 | 5/2009 | Binder et al. |
| 2009/0310485 | A1 | 12/2009 | Averi et al. |
| 2010/0039957 | A1* | 2/2010 | Kotrla ............... H04L 41/5009 370/253 |
| 2012/0036257 | A1* | 2/2012 | Mann ............... H04L 65/1066 709/224 |
| 2012/0042032 | A1 | 2/2012 | Fredette et al. |
| 2012/0117273 | A1 | 5/2012 | Averi et al. |
| 2012/0127977 | A1 | 5/2012 | Copeland et al. |
| 2012/0178483 | A1* | 7/2012 | Rosenau ............... H04W 28/16 455/509 |
| 2012/0284404 | A1* | 11/2012 | Hofstaedter ........... G06F 15/173 709/224 |
| 2012/0314578 | A1 | 12/2012 | Averi et al. |
| 2013/0238743 | A1 | 9/2013 | Fredette et al. |
| 2014/0173331 | A1 | 6/2014 | Martin et al. |
| 2014/0185445 | A1 | 7/2014 | Averi et al. |
| 2014/0207971 | A1 | 7/2014 | Lecourtier |
| 2014/0295877 | A1* | 10/2014 | Hart ............... H04W 4/02 455/456.1 |
| 2014/0304393 | A1* | 10/2014 | Annamalaisami ...... H04L 43/04 709/224 |
| 2014/0376379 | A1 | 12/2014 | Fredette et al. |
| 2015/0071067 | A1 | 3/2015 | Martin et al. |
| 2016/0094422 | A1* | 3/2016 | Poola ............... H04L 43/045 709/224 |
| 2016/0127901 | A1* | 5/2016 | Lee ............... H04W 12/06 713/181 |
| 2016/0182319 | A1 | 6/2016 | Martin et al. |
| 2016/0197802 | A1 | 7/2016 | Schultz et al. |
| 2016/0323169 | A1* | 11/2016 | Song ............... H04L 43/0876 |
| 2017/0264513 | A1* | 9/2017 | Pietrowicz ........... H04L 43/106 |

OTHER PUBLICATIONS

Final Office Action for U.S. Appl. No. 14/972,353 (dated Feb. 27, 2018).

Non-Final Office Action for U.S. Appl. No. 14/972,353 (dated Aug. 14, 2017).

Krasner, G. E. et al., "A Description of the Model-View-Controller User Interface Paradigm in the Smalltalk-80 System", "Journal of Object Oriented Programming", 1988, pp. 26-49, vol. 1, No. 3, Publisher: ParcPlace Systems.

* cited by examiner

METHODS AND APPARATUS FOR PROVIDING ADAPTIVE PRIVATE NETWORK CENTRALIZED MANAGEMENT SYSTEM TIME CORRELATED PLAYBACK OF NETWORK TRAFFIC

The present application is a continuation of U.S. patent application Ser. No. 14/973,343 filed Dec. 17, 2015 and published as U.S. Patent Application Publication No. 2016/0197802 A1 entitled "Methods and Apparatus for Providing Adaptive Private Network Centralized Management System Time Correlated Playback of Network Traffic", which claims the benefit of U.S. Provisional Application Ser. No. 62/096,049 titled "APN Aware Architecture (Part A)"; 62/096,071 titled "APN Aware Architecture (Part B)" and 62/096,086 titled "APN Aware Architecture (Part C)", all of which were filed on Dec. 23, 2014; and from U.S. Provisional Application Ser. No. 62/132,625 titled "Aware: An Adaptive Private Network Centralized Management System Discovery Process"; 62/132,987 titled "Aware: An Adaptive Private Network Centralized Management System Timestamp Correlation Process"; 62/133,071 titled "Aware: Adaptive Private Network Database Schema Migration and Management Processes" and 62/133,094 titled "Aware: Adaptive Private Network Centralized Management System Data Visualization Process" all of which were filed on Mar. 13, 2015; and from U.S. Provisional Application Ser. No. 62/187,516 titled "Methods and Apparatus for Providing Adaptive Private Network Centralized Management System Time Correlated Playback of Network Traffic" which was filed on Jul. 1, 2015, all of which are incorporated by reference herein in their respective entireties for all purposes.

CROSS REFERENCE TO RELATED APPLICATIONS

Related implementations of the present inventions have been disclosed in four other copending U.S. patent applications claiming the benefit of the provisional applications cited above and that have the same assignee as the present patent application. The related copending U.S. patent applications are 1) U.S. patent application Ser. No. 14/972,270, filed Dec. 17, 2015 and published as U.S. Patent Application Publication No. 2016/0182305 A1 entitled "Methods and Apparatus for Providing Adaptive Private Network Centralized Management System Discovery Processes"; 2) U.S. patent application Ser. No. 14/972,353, filed Dec. 17, 2015 and published as U.S. Patent Application Publication No. 2016/0182319 A1 entitled "Methods and Apparatus for Providing Adaptive Private Network Centralized Management System Timestamp Correlation Processes"; 3) U.S. patent application Ser. No. 14/972,514, filed Dec. 17, 2015 and published as U.S. Patent Application Publication No. 2016/0179850 A1 entitled "Methods and Apparatus for Providing Adaptive Private Network Database Schema Migration and Management Processes" and 4) U.S. patent application Ser. No. 14/973,193, filed Dec. 17, 2015 and published as U.S. Patent Application Publication No. 2016/0182327 A1 entitled "Methods and Apparatus for Providing Adaptive Private Network Centralized Management System Data Visualization Processes". The four related copending U.S. patent applications are hereby incorporated by reference herein in their respective entireties.

The present application is also related to U.S. patent application Ser. No. 14/146,786 filed on Jan. 3, 2014 which issued as U.S. Pat. No. 9,100,338; which is a divisional of U.S. patent application Ser. No. 13/592,460 filed on Aug. 23, 2012 which issued as U.S. Pat. No. 8,644,164; which is a continuation of U.S. patent application Ser. No. 13/353,693 filed on Jan. 19, 2012 which issued as U.S. Pat. No. 8,274,891; which claims the benefit of and priority to U.S. patent application Ser. No. 12/482,766 filed on Jun. 11, 2009 which issued as U.S. Pat. No. 8,125,907 entitled "Flow-Based Adaptive Private Network with Multiple WAN-Paths"; all of which claim the benefit of U.S. Provisional Patent Application No. 61/060,846 entitled "Flow-based Adaptive Private Network with Multiple WAN-Paths" filed Jun. 12, 2008; U.S. patent application Ser. No. 14/291,776 filed on May 30, 2014 which issued as U.S. Pat. No. 9,392,061; which is a continuation of U.S. patent application Ser. No. 13/850,411 filed on Mar. 26, 2013 which issued as U.S. Pat. No. 8,775,547; which is a continuation of U.S. patent application Ser. No. 13/208,825 filed on Aug. 12, 2011 which issued as U.S. Pat. No. 8,452,846 entitled "Adaptive Private Network Asynchronous Distributed Shared Memory Services"; all of which claim the benefit of U.S. Provisional Patent Application Ser. No. 61/372,904 entitled "Adaptive Private Network Asynchronous Distributed Shared Memory Services" filed Aug. 12, 2010; U.S. patent application Ser. No. 13/719,433 filed on Dec. 19, 2012 which issued as U.S. Pat. No. 9,069,727 entitled "An Adaptive Private Network with Geographically Redundant Network Control Nodes"; U.S. patent application Ser. No. 14/019,723 filed on Sep. 6, 2013 which issued as U.S. Pat. No. 9,584,407 entitled "An Adaptive Private Network with Path Maximum Transmission Unit (MTU) Discovery Process"; U.S. patent application Ser. No. 14/481,335 filed on Sep. 9, 2014 and published as U.S. Patent Application Publication No. 2016/0072706 A1 entitled "Adaptive Private Network with Dynamic Conduit Process"; all of which have the same assignee as the present application, are related applications, and are incorporated by reference herein in their respective entireties.

FIELD OF THE INVENTION

The present invention relates generally to improved network management. More specifically, the present invention relates to improved methods for configuring, monitoring, and analyzing an adaptive private network.

BACKGROUND OF THE INVENTION

Wide area network (WAN) standards include, for example, digital subscriber line (DSL), asymmetric digital subscriber line (ADSL), and multiprotocol label switching (MPLS), to mention a few. WANs are used to connect local area networks (LAN's) allowing devices in one location to communicate with devices and their users in other locations. In a WAN having a large number of remote sites, direct connections between the sites are many times statically configured. The dynamics of the network system may also change over time making repeated static configurations of the network inefficient and costly to implement. Further, static connections involve reservations of network resources. As data flow patterns change in the network, the reserved resources create non-optimal static connections which cause the network to reserve bandwidth that could be better used elsewhere in the network.

A model-view-controller (MVC) design pattern was articulated in the 1988 paper "A Description of the Model-View-Controller User Interface Paradigm in the Smalltalk-80 System" by Krasner and Pope. This MVC design pattern divides an application into the three components: a model, a view, and a controller. The model component maintains state of underlying data and applies operations on that data. The view component responsible for rendering of the data controlled by the model to a user. The view component is notified about changes to the data by the model and updates the rendered view of the data. The controller component is responsible for taking input from the user and sending appropriate messages to the model. A view component and controller component are typically paired and communicate with the same model component. A model component may interact with multiple sets of views and controllers. It is generally assumed in a framework of the MVC design pattern that the model has the ability to broadcast changes in the model to the views and controllers that it is connected with. However, this assumption does not hold in web applications. In web applications, a web browser updates its view only based on a request to the server that holds the model. As a result, changes to the model cannot be automatically pushed to the user interface. The MVC design pattern is a theoretical framework which provides a guide for system developers and is not related to any specific system. Further, the MVC design pattern framework by itself does not provide improved performance, reliability, and predictability of a network.

As networks become larger and more complex, administrative techniques for managing the network are increasingly more complex and costly. Prior techniques to separately configure, monitor, and analyze each node of a large network may not provide accurate information and are prone to errors.

SUMMARY OF THE INVENTION

Among its several aspects, the present invention recognizes what is needed is a management technique that provides more accurate and lower cost techniques to configure, monitor, analyze a network, and to present related data in a user friendly manner. Among its several aspects, the present invention addresses systems and techniques which improve discovery, database management, graph tree reporting, replay, and time correlation. To such ends, an embodiment of the invention applies to a method for time correlated playback of traffic patterns between nodes in a network. Node statistics of data transfers between nodes in a network having a plurality of nodes are received in a centralized control point, wherein the node statistics include a time stamp ($t_n$) according to time at the centralized control point of when a request statistics message was sent to each node of the plurality of nodes, a node timestamp ($t_a$) according to time at each node of when the message was received in the node, and a first delta between $t_n$ and $t_a$ that is used to determine a second delta which adjusts the node statistics. The node statistics adjusted according to the second delta are stored in a statistics database at the centralized control point. A time stepping mechanism is used to repeatedly access the node statistics for a set of nodes selected from the plurality of nodes in the statistics database at a predetermined rate for playback presentation through a user interface on the centralized control point beginning from a specified start time to a specified end time.

A further embodiment of the invention addresses a computer readable non-transitory medium storing a computer program which causes a computer system to perform a method for time correlated playback of traffic patterns between nodes in a network. Node statistics of data transfers between nodes in a network having a plurality of nodes are received in a centralized control point, wherein the node statistics include a time stamp ($t_n$) according to time at the centralized control point of when a request statistics message was sent to the node, a node timestamp ($t_a$) according to time at the node of when the message was received in the node, and a first delta between $t_n$ and $t_a$ that is used to determine a second delta which adjusts the node statistics. The node statistics adjusted according to the second delta are stored in a statistics database at the centralized control point. A time stepping mechanism is used to repeatedly access the node statistics for a set of nodes selected from the plurality of nodes in the statistics database at a predetermined rate for playback presentation through a user interface on the centralized control point beginning from a specified start time to a specified end time.

A more complete understanding of the present invention, as well as other features and advantages of the invention, will be apparent from the following detailed description, the accompanying drawings, and the claims.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1A:
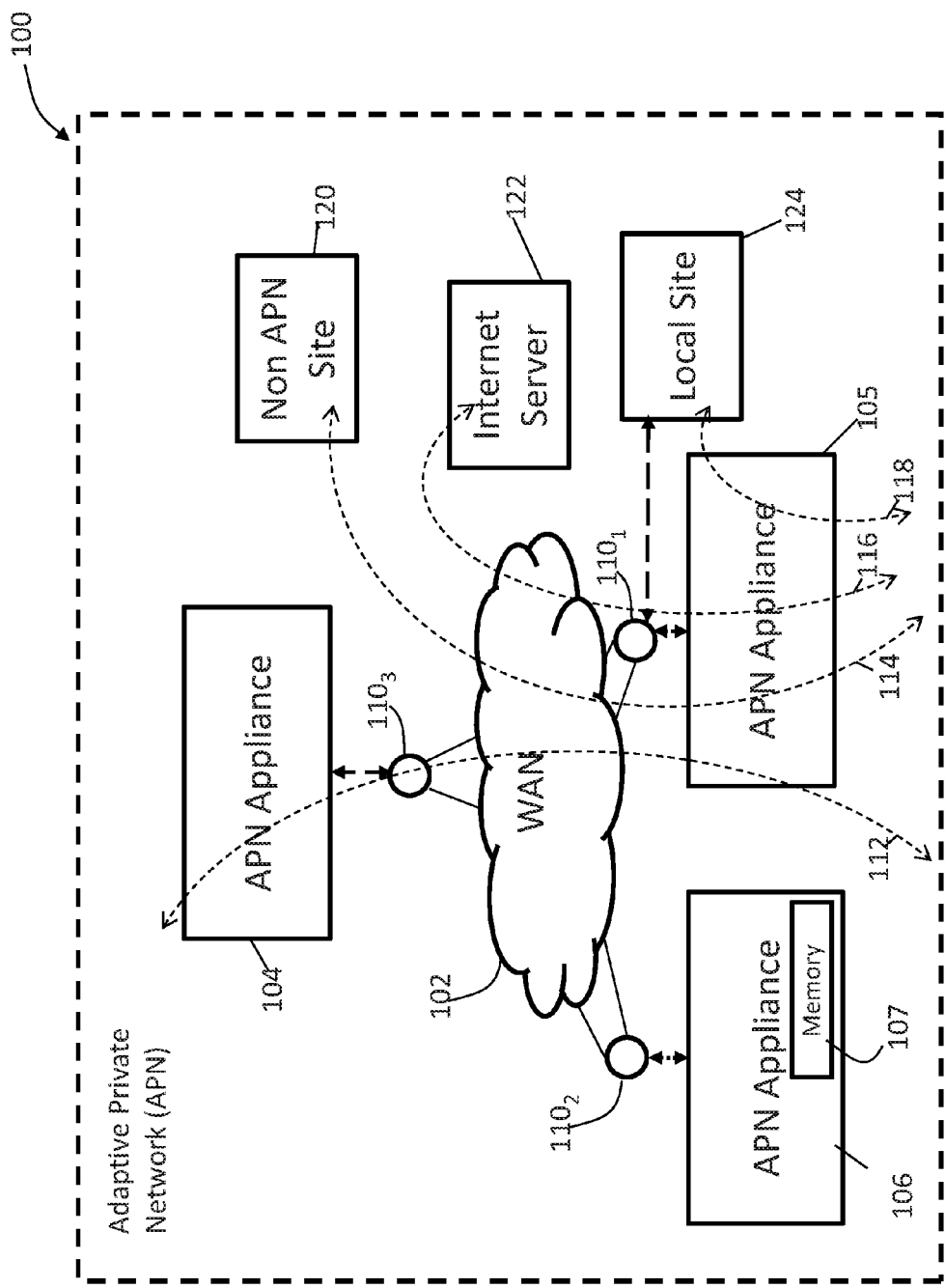
FIG. 1A illustrates an adaptive private network (APN) with APN network service paths in accordance with an embodiment of the present invention.

FIG. 1A shows an example of an adaptive private network (APN) 100 in which the present invention may be suitably employed as described in further detail below, including the network components, flows, paths, and services. The APN 100 includes one or more wide area networks (WANs), such as WAN 102, APN appliances 104-106, WAN routers $110_1$-$110_3$, and network application services as well as APN conduits between APN appliances, as described in more detail below. First, however, a number of terms used herein are defined with the meaning they have when used in the context of the present invention.

An APN path is a logical connection established between two WAN links located at different geographic sites across a WAN.

An APN conduit is a virtual connection between two APN nodes, also referred to as client sites, and formed by aggregating one or more APN paths and their allocated WAN link resources. The conduits overlay a virtual network on top of the underlying network.

A conduit maximum transmission unit (MTU) is a minimum link MTU of the one or more APN paths between a source site and a destination site.

An APN appliance (APNA) is a device that contains APN client site functionality including all software modules within. A high availability site contains two APNAs, one that is active and one that is in a standby mode of operation and available to become active in place of the other APNA if required.

A WAN link represents a physical access point to the wide area network (WAN), such as a digital subscriber line (DSL) connection or a cable modem. The distinctive characteristic of a WAN link is the bandwidth, or in other words, the amount of data capacity available for transmission and reception. WAN links can be shared among APN conduits, and intranet and Internet network services. In the present embodiments, the APN appliances do not directly attach to WAN links. APN appliances communicate with WAN links through logical connections, such as the WAN routers $110_1$-$110_3$ of FIG. 1A.

A private WAN link provides a physical access point to non-public WAN destinations. Examples of such private WAN links include an asynchronous transfer mode (ATM) link with an ATM virtual circuit, a frame relay link with a frame relay circuit, a multiprotocol label switching (MPLS) tunnel, a virtual private network (VPN) tunnel, or a leased point-to-point line. Connectivity on a network having a private WAN link is made to a private list of destinations on the other end of the network. A public WAN link represents a physical access point to the Internet. It can be assumed that any public WAN link can establish a connection to any other public WAN link.

A local WAN link (LWL) is an APN client site's access point to a WAN. A site A's LWL is coupled to a corresponding remote WAN link for a site B. For a conduit between a site A and a site B, site A's local WAN links are site B's remote WAN links.

A routing domain represents a group of sites that can reach each other via an intermediate site that has WAN-to-WAN forwarding enabled. All local routes of each site in the routing domain are added to all other sites in the routing domain.

A static conduit is a conduit configured in a configuration file and created at startup time of an APNA. A static conduit is not removed without changing the configuration file.

A dynamic conduit is a conduit created between APN clients when needed and which can be removed when no longer needed.

An APN service is a set of processing steps performed on packets that are transmitted through the APN. As illustrated in FIG. 1A, data traffic that moves through APN 100 and APN appliance 106 may require different types of services depending on where the sending and receiving stations are located. An APN service instance is a particular configured contextual instance of an APN service held in an APN appliance memory 107 internal to the APN appliance 106, for example. An APN service instance's memory contains, but is not limited to, context specific configuration data, statistical data, and tracking states data. For example, an APN client site may have multiple APN conduits that connect to remote APN client sites. For each APN conduit there exists a separate APN service instance for the APN conduit service type.

An APN conduit service associated with path 112 manages network traffic packets that are transmitted through the APN 100 from the APN appliance 105 through router $110_1$, through the WAN 102, through another router $110_3$ to APN appliance 104. The APN conduit service for path 112 operates on both APN appliances 104 and 105. The APN conduit service sends and receives data between a first geographic location that has an APN appliance 105 and a different geographic location that has an APN appliance 104 utilizing the full benefits provided by the APN conduit service for WAN resource allocation and network adaptation. An APN intranet service associated with path 114 is used to manage the sending and receiving of data between a first geographic location that has the APN appliance 105 and a different geographic location within an enterprise non-APN site 120 that does not have an APN appliance by way of a WAN link that is also utilized by other APN services.

In another embodiment, an APN intranet service, such as the one associated with path 112, may be used to send and receive data to and from a different geographic location that has an APN appliance, but an administrator selectively configures the APN not to use the APN conduit service 112 for a particular type or class of traffic. An APN Internet service associated with path 116 is used to send and receive data between a first geographic location that has the APN appliance 105 and a different geographic location that is external to an enterprise network by way of a WAN link that is also utilized by other APN services. For example, traffic using the APN Internet service may be associated with a network user accessing a public Internet web server 122. An APN pass through service 118 is used to send and receive data between a first geographic location that has an APN appliance 105 and a local site 124 within the same first geographic location. In another embodiment, an APN pass through service may be used to send and receive data between a first geographic location that has the APN appliance (APNA) 105 and a different geographic location within an enterprise network that does not have an APN appliance and does not traverse the WAN using any WAN links associated with any other APN services.

Dynamic conduits address changes in statically configured networks that are not just slow, gradual changes in network usage, but are happening in real time throughout a day across a global network. In real time, dynamic conduits dynamically optimize network performance adapting to changing communication patterns between nodes in the network. Dynamic conduits can also be used to offload traffic from intermediate nodes that may be experiencing congestion.

An adaptive private network (APN) software product according to the present invention runs as a centralized management system within a virtual machine to create APN configurations and to monitor system resources, analyze system resources, and manage a configured APN in operation as addressed further herein. Aware is a product name for a presently preferred embodiment of the centralized management system that includes capabilities that monitor, analyze, and provide discovery, timestamp correlation, and database schema migration processes of the present invention. The APN software of the invention, also referred to as APN virtual machine (VM) software, provides analysis and monitoring capabilities that are timely with respect to events to he tracked and monitored while the APN is in operation and provides storage for historical data as taught further herein. The APN system, also referred to as an APN VM system, reduces the time to configure APN appliances and the number of errors that can occur in configuring a system, as well as, to provide detailed performance data correlated across the WAN. The APN VM system further allows a centralized virtual single point of control by a network control node (NCN) for a physical network in which the NCN provides system wide timing synchronization. The centralized single point of control, also referred to as a centralized control point, is not limited to a central location within a network of nodes, may be at any point within the network, and may be coupled at a point that would be considered outside the boundary of a network. Centralized indicates the single point of control aspects of the APN as described further herein.

An onboard configuration facility is a software component designed to plugin to the APN VM system of the invention and provide an APN configuration compiler, APN configuration editing capabilities, and to provide an ability to create and edit network maps showing nodes of the APN and conduits between the nodes. Each version of the APNA software produces a version of the onboard configuration facility that understands an object model and configuration options for that version of APNA software. The APN VM system supports installation of multiple concurrent onboard configuration facility plugins so that a single APN software version can manage a variety of APNA software configuration versions. Each version of APNA software, the appliance code, is provided with a default version of the configuration facility, which is also referred to as a configuration plugin. Multiple configuration plugins may be installed. So, the term "onboard" is in reference to the configuration facility or "plugin" when it is running on the APN VM system or on an NCN.

An onboard configuration editor is a component of the onboard configuration facility that represents an APN configuration as a hypertext markup language (HTML) tree and accepts changes to the APN configuration from a user. The onboard configuration editor is closely coupled with a configuration compiler to make changes to the configuration HTML tree. The onboard configuration editor also integrates with a network map facility to display site nodes in a visual map representation of the APN.

An APN configuration file is a text file which describes a configuration of the APN. This configuration file serves as an input to the configuration compiler which generates registries for each APNA in the network.

The configuration compiler is a software program, such as a Java™ program, that can run on an APN VM system and converts an APN configuration file into either registries for use by APNAs or into an extensible markup language (XML) representation of the object model for use by the onboard configuration facility.

A configuration package is a software data file which contains the APN configuration file along with metadata. Such metadata includes the network maps that are derived from a specific APN configuration.

An onboard configuration facility package consists of the onboard configuration facility in a format which can be installed onto the APN VM system.

Adaptive private network appliance (APNA) settings are management settings that can be set directly on an APNA. These APNA settings include time parameters, such as for a time zone or tune zones and for network time protocol (NTP) including an NTP server address, settings for a Netflow server, user authentication, simple network management protocol (SNMP), event handling, and periodic status reports. These APNA settings are generally not configurable through the APN configuration file. Rather, the APNA Settings are managed on a network-wide basis through the APN controls and software of the invention.

A dashboard, in the context of the APN VM system, is a user configurable display screen which may be customized to display a subset of items from the rest of the APN VM system. Multiple dashboards may be created with one being chosen as a default home screen for a particular user.

Workspaces are a construct which allow a user to organize a set of objects, allowing the user to save and recreate a state of a management session. Workspaces are used in a similar manner to use of a 'project' in a software integrated development environment (IDE) which collects a set of source code files and associated build scripts and resources such as help text and images to create a complex graphical application.

Figure 1B:
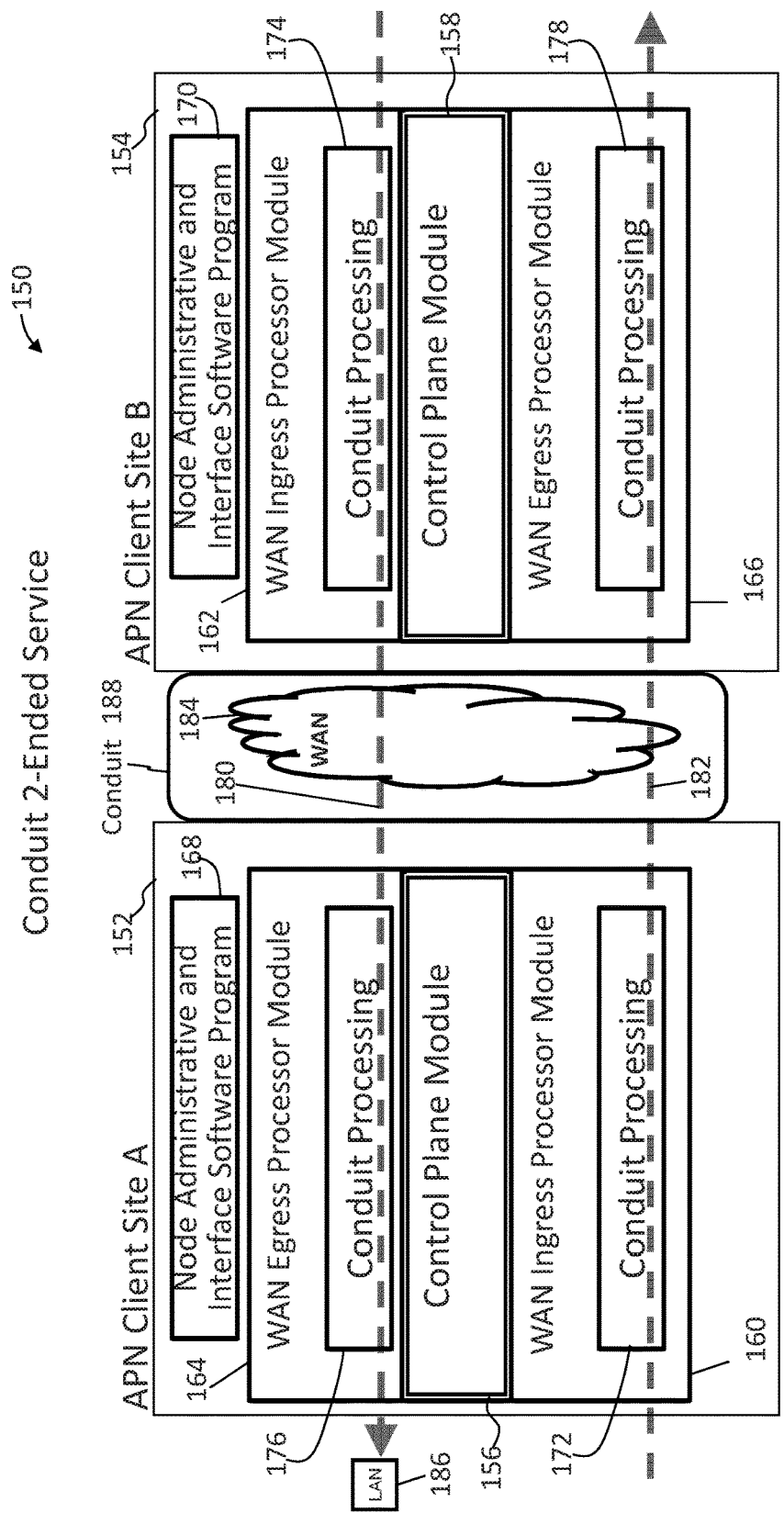
FIG. 1B illustrates an adaptive private network (APN) conduit providing two-ended service between a client site A and a client site B in accordance with an embodiment of the present invention.

FIG. 1B illustrates an adaptive private network (APN) conduit supporting two-ended service 150 between an APN client site A 152 and an APN client site B 154 in accordance with an embodiment of the present invention. Each APN client site is also considered a node in the APN and contains a collection of software modules which govern its participation within the APN. The software modules for the APN client site A 152 and the APN client site B 154 include control plane modules 156 and 158. WAN ingress processor modules 160 and 162, WAN egress processor modules 164 and 166, and node administrative and interface software program modules 168 and 170, respectively. As illustrated in FIG. 1B, the WAN ingress processor modules 160 and 162 include conduit services 172 and 174, and WAN egress processor modules 164 and 166 include a duplicate conduit service 176 and 178. Intranet service, Internet service, and pass through service are also provided at each APN client site. Each APN service type, including conduit, intranet, Internet, and pass through service types, implements processes for each type of data traffic that is communicated to and from the WAN respectively.

As illustrated in FIG. 1B, APN conduit traffic, identified by bold dashed arrow paths 180 and 182, flows through the two APN client sites 152 and 154 as the traffic traverses the APN. WAN ingress processing module 162 of APN client site B 154 performs the WAN ingress conduit service processing 174 prior to transmitting the traffic 180 via the WAN 184 to the APN client site A 152. WAN egress processor module 164 of the APN client site A 152 performs the WAN egress conduit service processing 176 prior to transmitting the traffic 180 to the node or nodes located on LAN 186. The binding of the one APN client site's WAN ingress conduit processing 174 to the peer APN client site's WAN egress conduit service processing 176 constitutes an APN conduit 188 in which traffic is actively monitored and managed across multiple WAN resources.

The APN is capable of using disparate asymmetric WAN links which frequently vary in behavior of bandwidth, latency, jitter, packet loss and congestion over time. For example, the APN can use an asymmetric DSL WAN link that transmits data at 512 kbps upstream to the WAN and 6 Mbps from the WAN through the public network combined with a private symmetric leased circuit T1 WAN link that transmits data at 1544 kbps upstream and downstream and a cable broadband connection that transmits data at 312 kbps upstream to the WAN and 3 Mbps from the WAN to a peer having adequate aggregation bandwidth of these rates for a single transmission control protocol (TCP) file transfer session at a theoretical transmit rate of 2368 kbps and receive at 10544 kbps or 10.544 Mbps. Practically, under good network behavior, the actual rate would approach 90% of these rates. If the behavior of the connection was to change, for example the paths to the DSL link were to have dramatic levels of loss, the APN would, using its high frequency performance feedback mechanism, adapt the network to avoid or mitigate the issues by using alternative resources or attempting to recover from the loss.

In all path selections, conduit paths are evaluated and the best available path is selected. Any paths currently in a path quality good state are eligible to be chosen first. If multiple paths are in a path quality good state, then an estimated end to end time is evaluated and compared for each path, and the path with the lowest end to end time is chosen. If no path is in path quality good state, then a path with the highest bandwidth path quality bad state is chosen. A "one way time" (OWT) refers to the amount of time it takes for a packet to traverse a network from source to receiver. In the context of this invention, the one way time is measured by subtracting a receive time stamp from a WAN Egress Module 166 from the send time stamp from a WAN Ingress Module 160, FIG. 1B.

Figure 1C:
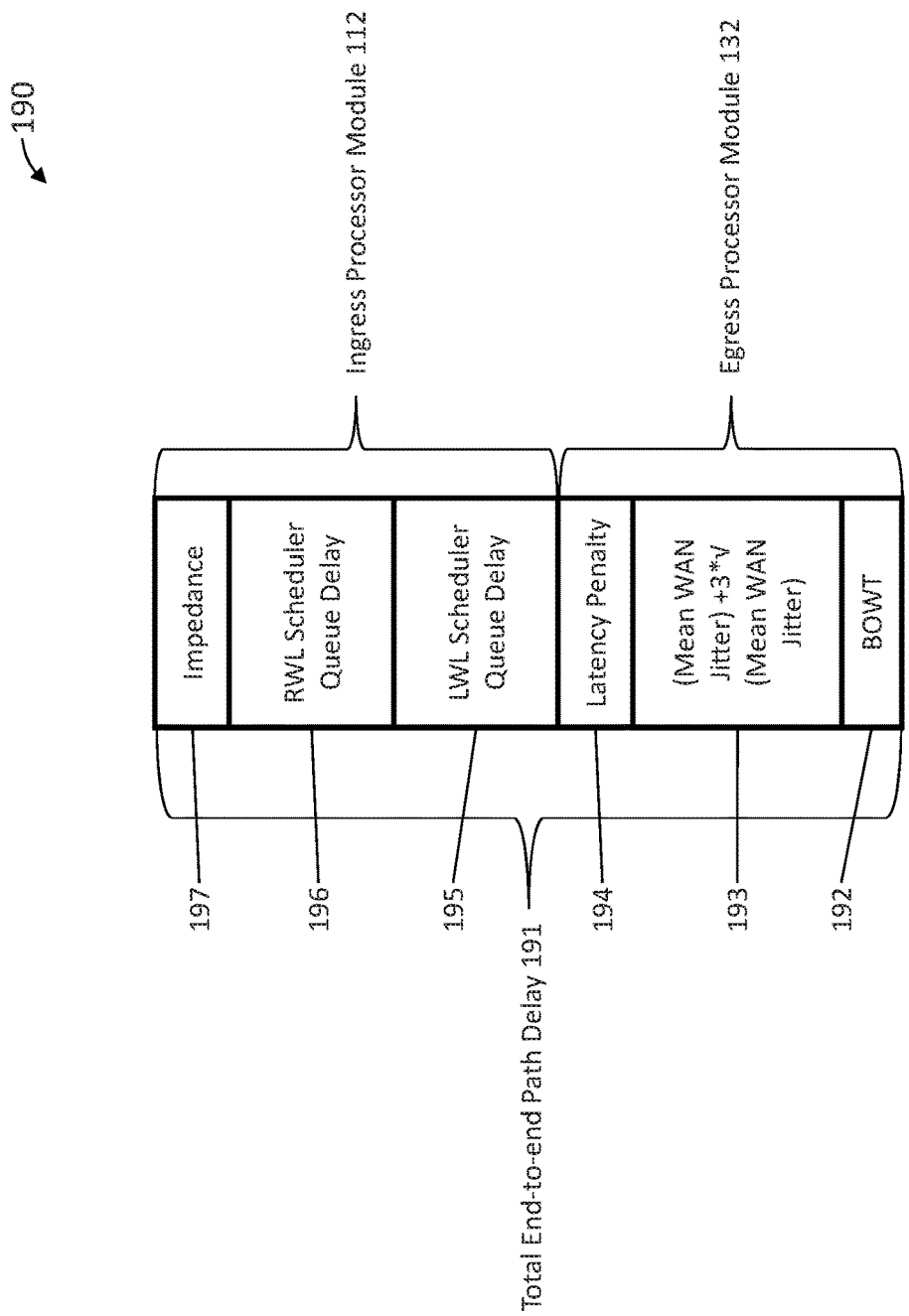
FIG. 1C illustrates a representation of factors used to determine the total end-to-end path delay in accordance with an embodiment of the present invention.

FIG. 1C illustrates a representation of factors 190 used to determine the total end-to-end path delay 191 in accordance with an embodiment of the present invention. The term "best one way time" (BOWT) refers to the lowest measured OWT for a particular packet on a particular path over a period of time. Initially, the evaluation process chooses one best path based on path latency which is calculated using a best one way time (BOWT) 192, mean WAN jitter 193, latency penalty for short term instability 194 and WAN link scheduler's queue delay times 195 and 196, with additional preferential treatment referred to as impedance 197 applied to any prior primary path for the APN traffic flow, if a primary path exists. Thus, an exemplary formula for estimating total end-to-end path delay is the BOWT 192+(mean WAN jitter 193)+3*($\sqrt{}$(mean WAN jitter 193))+latency penalty 194+local WAN link (LWL) scheduler queue delay 195+remote WAN link (RWL) scheduler queue delay 196+impedance 197. The BOWT 192, mean WAN jitter 193 and latency penalty 194 are provided by a remote APN conduit state resulting from control messaging from the egress processor module 166 of FIG. 1B. The local WAN link scheduler queue delay 195, remote WAN link scheduler queue delay 196 and impedance 197 are provided by the WAN ingress processor module 160 of FIG. 1B. U.S. Pat. No. 8,125,907 filed on Jun. 11, 2009 entitled "Flow-Based Adaptive Private Network with Multiple WAN-Paths" and incorporated by reference herein in its entirety provides further exemplary details of a presently preferred approach to timing and network control in an adaptive private network (APN) at col. 6, line 1-col. 19, line 27, for example.

APN path processing services are responsible for providing a means of communicating user data and control information from one APN node to another APN node across the network. In particular, user data and control information may be transmitted from the WAN ingress processor module 160 of one APN node across the WAN and received at the WAN egress processor module 166, as shown for example in FIG. 1B. Exemplary APN path services which may suitably be provided are listed below:

1. Universal path tagging of all conduit traffic sent across the WAN with high resolution and highly synchronized APN time stamps to enable the highly predictive estimation of transmission latency and statistical variation of latency, subsequently in tandem a control plane modules' path state monitoring service is used to detect optimal paths for traffic to use across the APN.

2. Use of the above optimal path identification to provide, in tandem with a WAN link accounting module, WAN bandwidth reallocation from low performing paths to higher performing paths.

3. Universal path tagging, of all conduit traffic sent across the WAN APN path with path sequence numbers, enables sub second detection of packet loss enabling fast retransmission of user packets with little to no negative effect to the end users.

4. Continual monitoring of and characterization of network behavior at times of lower utilization using heartbeats for fast reaction when network demand does arrive, such as provided by a heartbeat generator.

5. The ability to identify and proactively solicit retransmission when network traffic has been extraordinarily delayed or if the network has ceased to function using a Nag method, as provided by a Nag process, operating on the path state monitoring module.

6. Universal path tagging of all conduit traffic with network utilization and non-utilization of WAN link resources enabling early detection and avoidance of network congestion prior to the packet loss that is typical of normal TCP like congestion methods.

7. The ability to transmit time sensitive control messages without typical internal scheduling delays for software process staging to rate schedulers, while still maintaining proper long utilizations to the APN network to do retransmission of lost packets without the highly predictive estimation of transmission latency and statistical variation of latency.

The APN client node uses timing data to adjust or calibrate a network time by using a linear algebraic calculation based on the slope-intercept form. In a current implementation, y is the time at an APN control node, also referred to as a network control node (NCN), and x is the client node local time, b is the base offset between the two, and m is the rate of change of y versus x which is the slope. Using these definitions, an equation in slope-intercept form y=mx+b is expressed as network time=slope*client local time+base.

The slope is calculated by taking two samples over a pre-specified period and averaging the samples together. The base offset is calculated by taking the difference of the value between the network control point time and the client time, adjusted for one half round trip time (RTT).

Using queuing theory, Poisson distribution assumptions, and a highly accurate APN wide APN clock sync that allows for accurate one way time measurement, a method is provided that is typically capable of estimating path latency and statistical jitter with an accuracy approaching ~99%. An equation which may be suitably used is best one way time (BOWT)+(Mean WAN Jitter)+3*($\sqrt{}$(mean WAN jitter)). This equation provides a very accurate inference with just a few samples of traffic over a short period.

A path state represents the most current condition of the network path as determined by feedback received by the WAN egress APN node's path state monitoring process. As packets are received, the sequence numbers of the packets are tracked to see if any packets were lost in transit between the WAN ingress APN node and the WAN egress APN node. A method is used to trigger path state transitions that are biased toward more tolerance for loss in the short periods of packets received with substantially less tolerance of loss over longer periods. A unique aspect of this approach is the ability to track the path's packet loss thresholds over numerous durations nearly simultaneously and continually while still maintaining low processor overhead. This aspect is obtained through the universal path tagging of conduit traffic sent across the WAN with high resolution and highly synchronized APN time stamps to enable the highly predictive estimation of transmission latency and statistical variation of latency. In tandem, a control plane modules' path state monitoring service is used to detect packet loss and optimal paths for traffic to use across the APN. The result is an ability to detect a difference between occasional incidental short term network loss and long term persistent problems.

In a presently preferred embodiment, the APN node's software modules at a client site are stored and operate in the same physical APN appliance; however, the modules may also exist in separate physical APN appliances in alternative embodiments. The methods described in connection with the embodiments disclosed herein may be embodied directly in one or more software modules executed by a processor and memory complex such as a rack mounted processing device, a personal computer, a server, or the like, having one or more central processing unit devices. The processor and memory complex, for example, may be configured to execute instructions that access data and operate on data under control of a software module program stored on a computer readable non-transitory storage medium either directly associated locally with the processor and memory complex, such as may be available through an instruction cache, or accessible through an I/O device. A software module may reside in a computer readable non-transitory storage medium which may include random access memory (RAM), flash memory, dynamic random access memory (DRAM), synchronous dynamic random access memory (SDRAM), read only memory (ROM), programmable read only memory (PROM), erasable programmable read only memory (EPROM), electrically erasable programmable read only memory (EEPROM), hard disk, a removable disk, a CD-ROM, digital video disk (DVD), other types of removable disks, or any other suitable non-transitory storage medium. A non-transitory storage medium may also be coupled to the processor and memory complex such that the hardware processor can read information from, and write information to, the storage medium over an intranet or the Internet.

An adaptive private network node (APN client site) contains software modules required to participate in an adaptive private network. An APN node may exist in one or more APN appliances at a location. An APN node contains a collection of software modules which govern its participation within an APN such as control plane modules 156 and 158, WAN ingress processor modules 160 and 162, and WAN egress processor modules 164 and 166 in FIG. 1B. The control plane module is responsible for controlling and participating in the control of the APN node in tandem with other APN nodes in the network.

The WAN ingress processor module 160 may suitably be embodied as software and hardware components responsible for processing network traffic for transmission from a local area network (LAN) to a WAN. The WAN egress processor module 164 may suitably be embodied as software operating on hardware components, such as a processor and memory complex that is responsible for processing network traffic for transmission from a WAN to a LAN. WAN ingress and WAN egress processor modules are discussed in further detail below. The APN client site's control plane module 156 may suitably be embodied as software operating on hardware components, such as a processor and memory complex that utilizes the APN client site's WAN ingress processor module 160 and WAN egress processor module 164 as the means for transmitting and receiving APN node to APN node control data across the WAN.

Software packages for an APN are distributed through the WAN using control packets, termed Tapplication protocol (TAP), that is part of change management software or through administrative interfaces, such as downloading software using interfaces 168 and 170 to the APN client sites. The TAP is a protocol that is run on the WAN to allow processes outside of t2_app on different appliances to communicate with each other. The t2_app is a program that is running on each APNA communicating with other APNAs in the APN while forwarding user data. After a software update, the APN services on the APN client sites 152 and 154 are then restarted thus bringing the APN software node configuration into synchronization.

Figure 2:
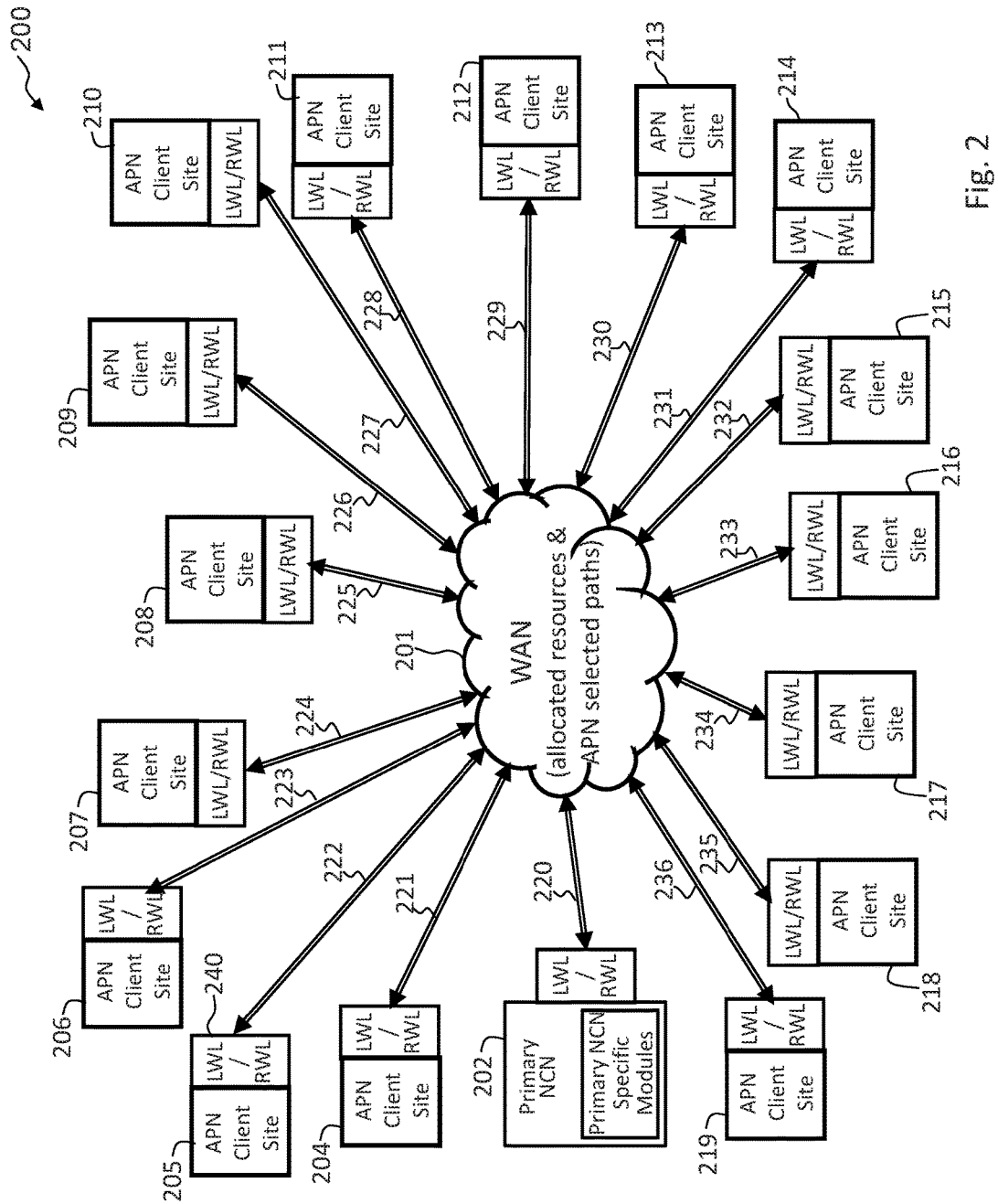
FIG. 2 illustrates an APN having an APN network control node (NCN) and sixteen APN conduits coupled to sixteen APN client sites in accordance with an embodiment of the present invention.

FIG. 2 illustrates an APN 200 having an APN network control node (NCN) 202 coupled to conduit section 220 and sixteen APN conduit sections 221-236 coupled to sixteen APN client sites 204-219, respectively, in accordance with an embodiment of the present invention. As illustrated in FIG. 2, in a presently preferred embodiment, APN 200 is centrally configured. A network administrator configures the entire APN 200 through an APN configuration file that is processed by the NCN 202. The NCN 202 then distributes the configuration settings to all client sites in the APN 200. This method of configuring the APN 200 is intended to provide benefits to the administrator by providing a single point of configuration to the network. It also assures configuration consistency and compatibility for all APN client sites in the network nearly simultaneously, with strict version checking. In a presently preferred embodiment, an intensive configuration audit and validation is done to the configuration prior to that configuration being applied to the network. This audit greatly decreases risks of invalid configurations being placed on the production network. The central configuration also provides for additional configuration bandwidth optimization for the network, by doing a mapping of the APN resources and their initial allocations. Furthermore, the centralized configuration can provide information and warnings to the administrator as to the behavior of the configuration that may not be obvious or intended from the configuration, before loading the configuration onto a production network.

Each of the sites 204-219 and primary NCN site 202 contains an APN appliance to provide APN functionality. The configuration of the APN 200, generally provides for connectivity between a site A, such as site 205, and for a site B, such as site 208, where the connectivity from the site A's perspective is site A→LWL→"WAN"→RWL→site B. The connectivity from the site B's perspective is site B→LWL→"WAN"→RWL→site A. The WAN 201 represents allocated WAN link resources and APN selected paths. In FIG. 2, a conduit between a site A and a site B is formed by use of the conduit sections 222 and 225 and is a virtual connection between the corresponding site A and site B. The conduit includes a collection of paths and encompasses a path from a LWL at site A→"WAN"→RWL at site B.

In one presently preferred embodiment, APN conduits exist between the NCN and, for example, sixteen APN client sites as shown in FIG. 2. It will be recognized that while sixteen APN sites are shown for purposes of illustration, a larger or smaller number of potential APN client sites may be suitably employed. Each APN conduit may have the unique configuration parameters tailored by an administrator for the particular needs of each geographic location associated with a particular APN.

For a definition of APN path states, a description of path processing services is provided below. Any paths currently in a path quality good state are eligible to be chosen first. If multiple paths are in a path quality good state, then an estimated end to end time is evaluated and compared for each path, and the path with the lowest end to end time is chosen. If no path is in a path quality good state, then a path in a path quality bad state with the highest bandwidth is chosen.

FIG. 2 is an exemplary APN 200 with geographically diverse client sites in accordance with an embodiment of the present invention. The exemplary APN 200 is configured with sixteen client sites 204-219, which are generally located remotely from each other. A site would be defined as remote if the devices are physically in different locations such as different buildings, cities, states, time zones or countries. For example, the primary NCN 202 may be located in a company's headquarters location in a first country with client sites 204-209 and client sites 217-219 also located in the first country. The other client sites 210-216 may be located in a second country.

As used herein, an APN appliance is a device that contains APN node functionality according to software modules, such as the control plane module 156 and 158, the WAN ingress processor module 160 and 162, and the WAN egress processor module 164 and 166, as described in more detail above with reference to FIG. 1B. The sixteen client sites 204-219 are coupled by conduit sections 221-236, respectively, and the conduit sections may be connected together to provide a configurable virtual connection between two connected APN appliances at the client sites. It is noted that while sixteen client sites 204-219 are illustrated, an APN may support as many client sites as are required.

A dynamic conduit is a conduit created between APN clients when needed and can be removed when no longer needed, based on a configured first threshold and a configured second threshold. For example, client site 205 can be configured with two local WAN links, one from a first network provider and one from a second network provider. Multiple conduits may be connected to site 205 which may be configured to use one or both of the local WAN links. In an exemplary scenario where all of the conduits that are connected to site 205 use both local WAN links, then when usage for either local WAN link passes a configured second threshold, creation of a dynamic conduit can be triggered as described in further detail below.

The centralized monitor, analysis and management software in accordance with the present invention installed on a server associated with the APN provides several functions which are useful in managing an APN. For example, a monitoring service monitors events data and provides results in a tabular format. A number of additional services are briefly described in this section.

1. APN discovery—a single point identification of all nodes in an adaptive private network (APN) which supports addition and removal of nodes in the APN. A network topology is a listing of nodes and how they connect in the APN. A network configuration is a listing of resources required by the nodes and their connections in the APN, for which some or all of the resources may be specified by a user of the APN. The discovery process automatically learns a new topology of the APN, which may change due to addition or removal of nodes and connections, without relying on the network configuration information. The APN VM discovers the network topology by requesting information concerning the nodes and their connections from the NCN. Network statistics are based on a timeline that a user has selected to examine, without being tied to a particular configuration. If the APN has changed, objects, such as appliances and links, either show up or not show up in the network topology based on the time line that is selected.
2. APN configurability—Configuration changes can be made from APN VM based on latest configuration information obtained from the NCN. The application of the configuration changes are accomplished at the NCN and an updated configuration is activated from the NCN. This process of updating a configuration is separate from the discovery and statistics gathering process as described in more detail herein. Discovery and statistics gathering does not depend upon the current operating configuration. A web-based user interface (UI) is provided which allows the user to build and edit the APN configuration file which describes the APN. Since the APN configuration features change from release to release, it is important for the APN software to be able to know how to build a configuration that is correct for the software that is running, or going to run, on the APN. This capability is provided by having the APN VM system install an onboard configuration facility package corresponding to a given APNA software release. This onboard configuration facility package is installed with the APN software and the package can be manually updated by the user.
3. APN time consistency of the present invention makes gathering of statistics about the APN robust in the face of time changes and time discrepancies across the APN. The APN VM system uses a strict rule that its view of time is correct and distrusts any APNA views of time. When statistics are received from an APNA, the timestamps in the statistics are remapped to correspond to the APN VM system's timeline at the server running the APN software of the invention, the APN server.
4. APN map generation—The UI provides support for creating network maps based on the sites and conduits in an APN configuration file. Users are allowed to upload their own map background, choose the sites that appear on the map, and customize the positioning of sites. Multiple maps can be generated from a single APN configuration file. The map functionality of the APN software focuses on placing the network data that the APN VM system has onto a background provided by the user.

5. APN graphing—Users can create customized sets of graphs based on statistics gathered from the APNAs. These graph sets allow the objects, measured data, and time range to be customized. Graph sets can be added to dashboards and saved for future use. The configuration data is not stored with the monitor data and is not directly used with the graph visualizations.
6. APN reports—Users can create reports that contain tables of data that are aggregated over a time range. The objects, measured data, and time range can be customized. Such reports can be added to dashboards and can be saved for future use. The configuration data is not stored with the monitor data and is not directly used with the report visualizations.
7. APN map monitoring—The network map created with a configuration can be used to monitor an APN. In this mode, the map colors the conduits to indicate the state of the conduits and paths and provides tooltips for the sites and conduits to display detailed statistical data. For example, the color coding and line width provide visual cues to network performance. The amount of bandwidth is indicated by the width of a line and the colors indicate a state of a conduit. For example, a conduit illustrated in green indicates the conduit and paths are good, if illustrated in orange indicates the conduit and paths may be operative but in a bad state with relatively high loss rates, and if illustrated in red, indicates a conduit and paths are not usable. A dashed line with alternating colors indicates, for example, that the conduit and paths have different states. Arbitrary points in time can be selected to provide a visual representation of what the map looked like at that point in time. A time stepping mechanism is provided to allow the user to watch how the network has changed over time. The time stepping mechanism can be used to look at a series of data such as the conduit send/receive bandwidth and loss over time. This approach could be thought of similar to viewing a sequence of pictures where the subject matter is changing between picture frames. However, in this case the subject matter is data representing a conduit send/receive bandwidth value or loss counter for a given moment in time. The time stepping mechanism has an option that allows the data to be advanced automatically after every specifiable time, such as 1 second to the next moment in the time series when using the time stepping playback mode. The rate of playback is user configurable to allow the user to control how fast or slow the data moment is advanced. The user could automatically advance to the next 1 minute, 5 minutes, 15 minutes, . . . 24 hours to view a series of conduit send/receive bandwidth data values. The user could also single step forwards or backwards to view the data one moment at a time as well as jump to the first or last moment in time. These maps can be added to dashboards and can be saved for future use. The map visualizations make use of the configuration data to know what sites to display and the placement of the site within the map visualization.

Figure 3:
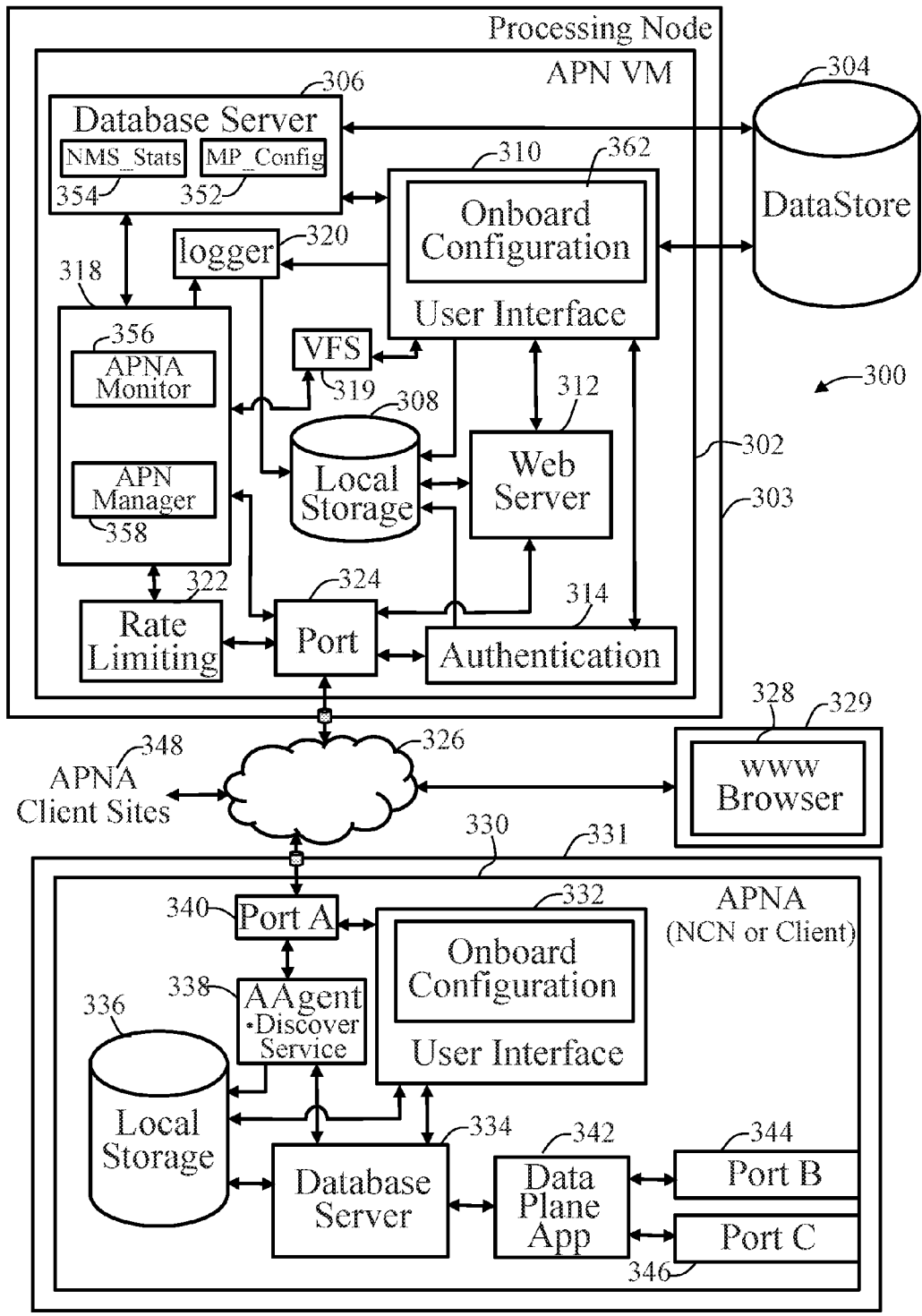
FIG. 3 illustrates an APN centralized management system that monitors, analyzes, and provides discovery, timestamp correlation, and database schema migration processes in accordance with an embodiment of the present invention.

FIG. 3 illustrates an APN centralized management system 300 that monitors, analyzes, and provides discovery, timestamp correlation, and database schema migration processes in accordance with an embodiment of the present invention. The APN centralized management system 300 comprises an APN virtual machine (VM) 302 according to the present invention as described herein and operating in the APN software server, such as a processing node 303, a datastore 304, an APNA 330 operating in a processing device 331, a world wide web (www) browser 328 operating in a processing system 329 which may be remote or locally accessible from the processing node 303 and processing device 329, and a plurality of APNA client sites 348.

In the APN, a network control node (NCN) is connected to the client nodes of the network, such as shown in FIG. 2 where the primary NCN 202 is connected to the sixteen client sites, also referred to as client nodes, 204-219. The APN also uses a management network as a separate logical or physical network that separates user data plane application traffic from management plane traffic. Each of the client nodes provides their management IP address to the NCN. The APN VM is able to use the NCN as a single point of access to obtain the management IP addresses of the clients and then directly poll the client nodes for additional information. In such a configuration, a client node does not have access to any other client's management IP address providing enhanced security for the APN. The APNA 330 may be a client node or, by ensuring security of the APN is not decreased or compromised, an NCN. Also, by ensuring security of the APN is not decreased or compromised, the processing node 303 may be an NCN or a client node of the APN. The centralized management system 300 discovers, via an active NCN, active, standby, and redundant devices during a discovery phase. Once the management IPs are learned, APN VM contacts the clients directly, as part of the discovery process. As part of a polling process, the centralized management system 300 is able to discover the network topology via the active NCN, such as determining which appliances are active in high availability (HA) systems as well as geographically diverse (GEO) sites.

The APN VM 302 includes a plurality of components including a database server 306, a local storage 308, an APN VM user interface (UI) 310, a web server 312, an authentication function 314, a monitor and manager 318, a virtual file system (VFS) 319, a logger 320, a rate limiting function 322, and a port driver 324. The port driver 324 connects to a hardware interface such as an Ethernet interface to a network 326, such as a management network. For security reasons, the same interface used to communicate with the appliances is also the interface used to access the APN software from the processing device 329 to prevent a backdoor into the network. A management network is a separate logical or physical network that separates user data plane application traffic from management plane traffic. The management network as used herein could be thought of as a private management network.

The APNA 330 comprises a plurality of components including an APNA UI 332, an APNA database server 334, an APNA local storage unit 336, a local server identified as an appliance agent (AAgent) 338, a port A driver 340 which is the management network interface port on the appliance, and a data plane application (app) 342, a port B driver 344, and a port C driver 346. The data plane app 342 is an executable program which performs all communication processing of latency, loss, and jitter calculations on packets received and transmitted on the APNA, such as NCN clock synchronization packets and data communication packets. On a periodic basis, in response to a poll from the APN VM 302, such as every minute, the data plane app 342 updates the APNA database server 334 with statistics about the traffic processed over that minute for storage in the APNA local storage 336. Upon request from the monitor and manager 318 on the APN VM 302, the AAgent 338 gathers statistics from the APNA database server 334 or from the APNA local storage 336. The AAgent 338 packages up the gathered statistics into a report package file and sends the report, using the port A driver 340, through the management network 326, to the monitor and manager 318. The monitor and manager 318 unpacks the report package and sends the unpacked data to the database server 306 for storage in the datastore 304.

On the APNA that operates as a network control node (NCN), such as APNA 330, a discovery service is provided by the AAgent 338 for use by APN VM 302. A user may use the discovery service to configure the APN VM 302 by use of the management Internet protocol (IP) address of the NCN. The APN VM 302 uses the NCN management IP address to access the discovery service and obtain the complete list of APNAs in the network.

The APN VM 302 may suitably operate as a virtual machine on a hypervisor, such as VMware ESXi. The APN VM 302 stores and accesses statistics, information associated with network maps, and configuration data associated with the APNA 330 and APNA client sites 348 in the datastore 304. While the datastore 304 is shown outside of the APN VM 302, the APN centralized monitor, analysis and management system it so limited. The location of the datastore 304 is configurable by a user. A base operating system, application software, and operation logs are stored in the local storage 308. A logger 320 records logs of operating events and takes care of rotating and pruning log files. A port driver 324, provides a communication interface such as an Ethernet interface, coupled between the APN VM 302 and the management network 326. A user may use a web browser 328 connected to the management network 326 to access the APN VM UI 310. The management network 326 is also connected to APNA client sites 348 and APNA 330 by means of management ports, such as port A driver 340. The network monitor portion of the monitor and manager 318 communicates with the AAgent 338 component of the APNA 330 and other agent components of the APNA client sites 348 to gather data and perform operations on the plurality of APNAs. The monitor and manager 318 uses a virtual file system (VFS) 319 to accept requests and communicate status to the rest of the user interface.

As an example, in a particular customer installation, an administrator installs the APN VM 302 on a processing node 303 running a hypervisor, such as VMWare ESXi 5.1, that, for example was already available on the customer's system. The administrator of the network uses the VM ware login facilities of the processing node 303 to determine the IP address of the APN VM instance, allocated by use of a dynamic host configuration protocol (DHCP) or uses a command line tool to set the IP address of the APN VM 302. The administrator then logins to the APN VM UI 310 with a web browser 328 and adds himself and other administrators as users of the APN VM 302. The administrator configures the domain name system (DNS), network time protocol (NTP), and time zone settings. The administrator instructs the APN VM 302 about the APN by configuring the IP address of the NCN, downloads security credentials certificates from the APN VM 302 and installs them on the NCN. The NCN automatically pushes those security credentials to all appliances in the APN. The APN VM 302 connects to the NCN, discovers the management IP addresses of all of the clients in the APN, connects to each of those appliances, and then displays to the administrator information about each appliance in the network, the APNA 330 and the APNA client sites 348. This information may suitably include the name of the appliance, management IP address, model number, serial number, software revision, registry timestamp, connectivity information, and polling status. A user enables polling of the network on the APN VM UI 310 and the APN VM 302 starts gathering statistics, starting with the earliest statistics available on the APNAs. The user does not need to set the polling period as a suitable default value, such as five minutes, is automatically used. The APN VM 302 displays graphs quickly from when the APN sites were initially installed and within two hours, for example, statistics from all of the appliances for an entire two week period are available in APN VM 302. The APN VM 302 systematically collects statistics starting with the oldest data and working towards the newest. The data is gathered at a specified pace so as not to cause performance problems on the management network or the APNAs using rate limiting module 322.

The APN VM UI 310 stores user session information in local storage 308 and stores configuration files and network maps in the datastore 304. The database server 306 comprises a management plane (MP) configuration (MP_Config) database file server utility 352 and a network management system (NMS) statistics (stats) file server utility 354 associated with corresponding databases in the datastore 304. Additionally, a third database, NMS_Events, included in the datastore 304 that stores event data from the APNAs and the NMS. The MP_Config database file server utility 352 accesses an MP_Config database in the datastore 304 that contains data related to the APN VM UI 310 and the monitoring and management of APNAs as provided by the monitor and manager 318. The monitor and manager 318 comprises an adaptive private network appliance (APNA) monitor 356 and an APN manager 358. The APNA monitor 356 periodically polls information from the APNA, NCN, or Client 330. The APNA monitor 356 includes capability to generate a statistics (stats) request and unpack a response to the stats request. The APNA monitor 356 also includes capability to export appliance settings to the NCN and one or more client appliances. Export in this context means transmitting appliance specific settings to individual appliances and applying those settings on the appliance.

The APN manager 358 includes support for managing an APN discovery service which interacts with agents on an active NCN, such as AAgent 338 of FIG. 3. The APN manager 358 also includes the capability to import and export configuration information between the APN VM 302 and the active NCN. The APN manager 358 also downloads the active configuration file from clients which normally should be the same as the ones listed by the active NCN, unless a client cannot communicate with the active NCN via the WAN but the APN VM can connect to the client by means of the management network. The APN VM UI 310 maintains current and previous user settings, workspaces, and dashboards in the MP_Config database file server utility 352 or the database server 306.

The NMS statistics file server utility 354 accesses a NMS_Stats database in the datastore 304 that contains the statistical data gathered from the APNAs. The NMS_Stats database has tables for each type of object, such as specified below. By a specified convention, for each <object type>, a set of tables is specified, including: <object type>s, <object type>_minutes, and <object_type>_hours. The <object type>s table contains the names and id numbers for the objects. The <object type>_minutes tables contain the minute samples for the objects. Each row in an <object type>_minute table contains an object_id which corresponds to an id in the <object type>s table. Each row in an <object type>_minute table also contains an update_epoch_time_s column which reflects the network management system (NMS) time at the time the minute sample was taken on the appliance and generally not when statistics are gathered. The rest of the columns in the row reflect the counts of the data for the event that is being tracked for that minute. The update_epoch_time_s is the epoch at which a sample was gathered on an APNA relative to the system clock on the APN VM 302. An update_epoch_time_s entry reflects the network management system (NMS) time at the time the minute sample was taken. So, the update_epoch_time_s is a converted time from when the minute sample was taken on an appliance, since the time on the appliance is most likely not the same as the time on APN VM 302 which is the NMS time. The rest of the columns in the row also reflect the counts of various metrics important to the object for that minute. The various metrics include packet counters, byte counters, latency measurements, and the like. The count values are values of data gathered during that minute and are not a cumulative total since the start of the tracking. The <object type>_hours table is similar to <object type>_minutes except that it aggregates an hour's worth of data from the <object type>_minutes table into a single row. This approach improves the APN VM UI 310 performance in cases where data across a large span of time needs to be aggregated. For example, performance of data transfers can be captured by tracking packets in each direction as they traverse every path of the WAN without using probes or injecting test data. An hour row in the <object type>_hours table represents data from the top of the hour to the end of that hour, for example, from the first <object type>_minutes row whose update_epoch_time_s is after 1:00 to the latest <object type>_minutes row whose update_epoch_time_s is before 2:00. A column in the <object type>_hours row shows how many minute samples are represented in that row. It is legal to have <object type>_hours rows with less than 60 minute samples since for the given hour the system may not have been collecting data for the entire hour, such as an hour interrupted by the data plane app 342 being disabled. For example, if a conduit or path is disabled, or if an entire site is offline, there will be minute intervals that contain no data. Thus, in the hours tables, this lack of data is represented by a count of minutes <60. It is also legal to have <object type>_hours rows with more than 60 minute samples, such as may occur in response to a high availability (HA) switchover to a backup processor device and have an overlap of minutes from both processor devices or as a result of a time change.

The limit_bandwidth_usage file limits how much bandwidth the APN VM 302 will use when communicating with the APNAs. Note that this controls the aggregate bandwidth and is not a per connection setting. The unit used by this file is kbps. The default is 1000 (1 Mbps).

The poll_all_apnas file controls whether all appliances in the APN should be polled for stats.

The slat_poll_interval_min file controls how often the APN VM 302 polls APNAs for stats. The default is five minutes. The unit used by this file is minutes.

The APN VM 302 is configured to regularly request the latest network statistics from each appliance, such as statistics since a previous request was made. Also, if the APN VM 302 is ever down or loses communication with a specific APN appliance (APNA), the APN VM 302 provides a "catching up" function that polls for stored statistics up to and including current operations on the specific APNA. The APN VM 302 maintains a list of APNAs that it is polling for statistics in a managed_appliances table of the MP_Config database file server utility 352 and associated MP_Config database in datastore 304.

Figure 4A:
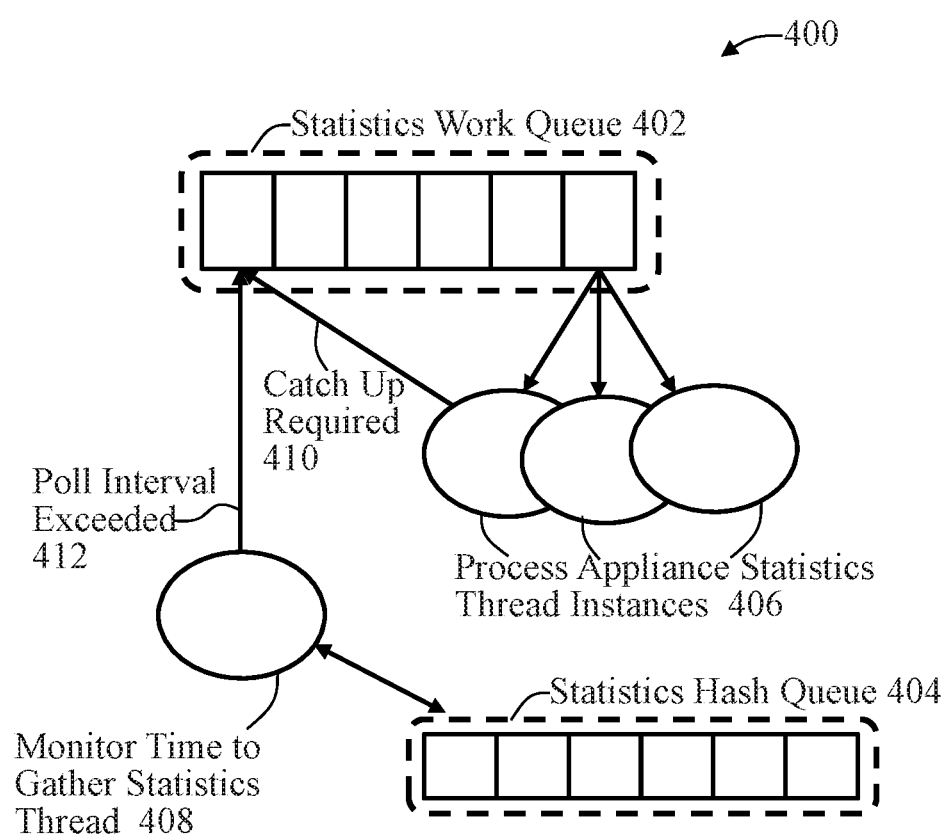
FIG. 4A illustrates an APN statistic polling architecture of the threads and data structures used to manage the polling for statistics in accordance with an embodiment of the present invention.

FIG. 4A illustrates an APN statistic polling architecture 400 of the threads and data structures used to manage the polling for statistics in accordance with an embodiment of the present invention. The APN statistics polling architecture 400 comprises a statistics_work_queue 402, a statistics hash queue 404, process application statistics thread instances 406, and a monitor time to gather statistics thread 408. Also, for purposes of tracking the polling, the managed_appliances table contains columns of polling state for each APNA as listed in Tables 1 and 2 and described in further detail below.

TABLE 1

APN Polling state

| Column Name | Type | Notes |
| --- | --- | --- |
| poll_interval_min | int | The interval, in minute, that APN VM 302 collects data from the APNA when not in catch up mode |
| Limit_bandwidth_usage | int | The bandwidth, in kbps, APN VM 302 allows to be consumed for stats collection |

TABLE 2

APNA Polling state

| Column Name | Type | Notes |
| --- | --- | --- |
| site_name | varchar | Client site name |
| appliance_id | tinyint | Appliance identification (id) |
| last_stat_poll_time | datetime | The time that APN VM 302 last polled this APNA |
| stat_poll_disabled | tinyint | True if APN VM 302 should not poll this APNA |
| last_minute_reported | int | The minute counter of the last minute of data from the APNA |
| last_timestamp_reported | bigint | The timestamp of the last minute of data from the APNA |
| max_minute_available | int | The largest minute that the APNA has available |
| max_timestamp_available | bigint | The timestamp of the largest minute that the APNA has available |

The APNA monitor 356 running the monitor_time_to_gather_stats_thread 408 checks the database at predetermined time intervals, such as every 15 seconds, to see if the interval between the current check time and the last_stat_poll time is greater than the poll_interval_min. If the interval is greater the poll_interval_min, then APNA monitor 356 determines that it is time to poll that APNA for statistics. The poll_interval_min column of the managed_appliance table 2 contains the polling interval (in minutes) that the APN VM 302 should use. By default, this value is five minutes.

The appliance_monitor, APNA monitor 356, maintains the hash table named stats_hash_queue 404 that contains a listing of APNAs for which a statistics poll is currently in progress. An APN VM 302 instance performs one statistics poll on a single APNA at any one time, although polling of multiple APNAs can be scheduled at the same time. The stats_hash_queue 404 allows the APN VM 302 to determine if a poll is already in progress. If the monitor_time_to_gather_stats_thread 408 determines that a poll time has expired and that there are no polls currently in progress at a specific APNA, the APNA monitor 356 initiates a statistic poll of the specific APNA.

The statistic poll of a specific APNA is initiated by adding an entry into the statistics hash queue 404 to mark that a poll is in progress and then adding a stat_item message onto the statistics_work_queue 402. There are multiple process_appliance_statistics thread instances 406 that read from the statistics_work_queue 402 to find work to do. The exact number of these threads is automatically tuned based on the number of CPUs on the processing node 303 with a range, for example of 8 to 50 CPUs. In general, 6 threads are made available for each CPU after the first CPU.

Each stat_item in the statistics_work_queue 402 contains identifying information of the APNA, the information about the last poll that was done and the number of minutes requested. One of the process_appliance_statistics_thread instances 406 takes a stat_item from the statistics_work_queue 402, initiates a request to the identified APNA and waits for a response. When the response is received, a statistics (stats) package is processed and associated statistics data is added through the NMS_stats file server utility 354 to the NMS_stats database in datastore 304. As part of processing the stats package, one of the process_appliance_statistics_thread instances 406 is able to determine if the APNA has additional data that has not been retrieved yet. If that is the case, then a catchup mode is started. In the catchup mode, one of the process_appliance_statistics_thread instances 406 adds another stat_item message to the statistics_work_queue 402 with a larger number of minutes than a previous polling period. In the catchup mode, a poll is requested with a poll_interval_min*4 minutes of data, up to a maximum of sixty minutes.

Figure 4B:
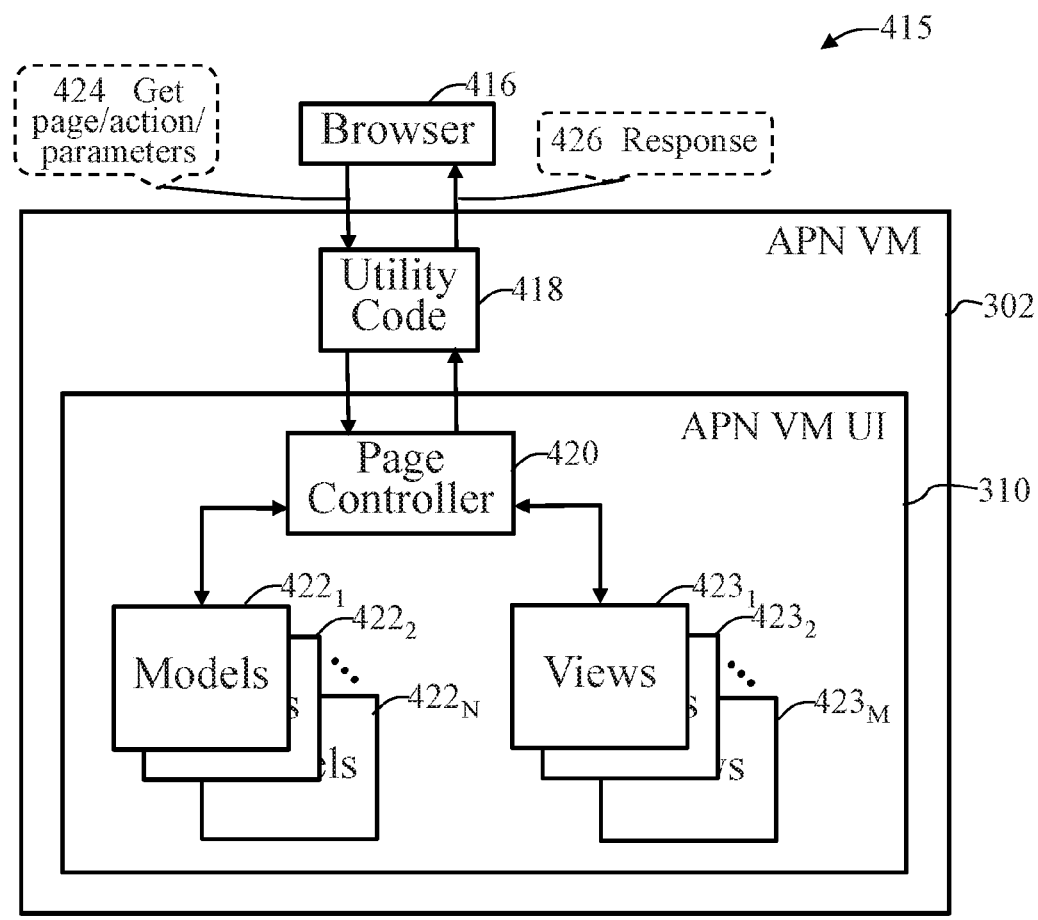
FIG. 4B illustrates an APN user interface (UI) request response flow in accordance with an embodiment of the present invention.

FIG. 4B illustrates an APN user interface (UI) request response flow 415 in accordance with an embodiment of the present invention. The APN VM system uses a web based user interface and in web applications, a web browser updates its view only based on a request to the server that holds the model view. In this web based environment, changes to the model view cannot be automatically pushed to the user interface and as a result the APN VM system regularly polls for updates and makes requests for updates as appropriate.

When the web browser 416 tries to access the uniform resource locator (URL), utility code 418 parses the URL and determines which web page controller 420 should receive the request and what the action should be. A web page controller is considered one of the process application statistic thread instances 420. For example, an http GET request on dashboard/view/1 results in the view action being called on DashboardController with the parameter value of 1. When the selected web page controller receives the request, it responds to the request and calls an appropriate view $423_1, 423_2, \ldots 423_M$ to render a response. Dashboard is a "type", page one is an "instance", and it is possible to have multiple dashboards. Typically, handling the request involves dealing with one or more models $422_1, 422_2, \ldots, 422_N$. These models control access to how data is stored in a database in accordance with the present invention and manipulated. For example, the dashboard/view/1 request would use a dashboard model, which provides access to a data server database which holds the dashboard settings. The dashboard model provides a way to lookup the dashboard information based on a dashboard ID which is 1 in this example. After processing a lookup and setting variables as required to store the results of the lookup, the "view" is rendered by calling a dashboard/view file. In this example, the utility code 418 implicitly renders the page, but, depending on implementation, the utility code 418 could be explicitly called by the page controller 420 to render a view. Such configurable dashboards allows a user to customize their displays, creating views that fit how they perceive their network, and store multiple dashboards in a single database for easy retrieval. For example, geographic oriented dashboards display the performance of individual regions, quality of service dashboards display selected attributes, such as performance, of identified mission critical applications, and carrier specific dashboards may be used to highlight WAN link metrics for easy monitoring of various service providers. Additional capability is provided by tool tips and drill downs that provide quick access to more detailed information.

A web page controller 420 often interacts with several models to deal with the data related to the request and typically selects one view to use and render the requested data. In different APN VM systems, the number of models each web page controller uses and the number of views that a selected web page controller might use can vary between the different APN VM systems. The data flow in the APN VM UI 310 includes significant scripting within the browser. This scripting is used for many reasons including polling of data to provide live updates, improve interactivity, and validate the input. When a view renders a page, it provides a template to the browser JavaScript™ that is necessary for the proper operation of the page.

Since APN VM 302 shows a network view of an APN or portion thereof where statistics from multiple APNAs are viewable on the same graph, it is important to show data that is correlated in time as occurring at the same time on the APN VM UI 310.

There are different concepts of time used in the APN. APN time is used for the purposes of forwarding traffic through conduits in the APN. The APN time is based on a network wide clock that is sourced from the NCN and that all clients synchronize to. The APN time is primarily used by processes that are involved in forwarding packets. The network wide clock is used to provide accurate time-based network measurements of latency and jitter, for example, and for communications between nodes. For example, a node A is configured to retransmit five milliseconds worth of data starting at time "t" to node B. The network wide clock is not associated with information such as a current date or an international time zone, which can occur in APNs having different client nodes in different time zones.

In contrast to the APN time, a system time, also referred to herein as a network management system (NMS) time, is used in the APN and is based on a system clock for Linux and the management processes. The system clock is generally configured to match the rest of the world's view of time. The network time protocol (NTP) is supported and may be used to set and control the system time. Changes to system time have no impact on the APN time and vice versa. For example, when the APN forwarding plane writes statistics into the database, system time is used to mark the time of the sample. The concept of time used by the APN VM 302 is that of a system time.

A time synchronization protocol like NTP is not used to force all the APNAs to synchronize to a network management system (NMS) time. Even with a time synchronization protocol available, it is possible to have time discrepancies in a network. To avoid time discrepancies and provide a robust way of handling time changes and time differences between APNAs, a rule is made that APN VM 302's view of time is correct and that all APNA timestamps are required to be mapped to APN VM 302's timeline. This makes things easier for a network administrator as the APN VM system time provides a correlated time for all NCN and client appliances. The APN VM system time is defined as the time configured on the APN VM 302. For example, when stats are received in APN VM 302 from an APNA, timestamps in the stats are mapped to correspond to APN VM 302's timeline. The mechanism that we use to do this mapping is described below.

A brief introduction to how an APNA organizes statistics is provided below. Following the brief introduction is a description on how an APNA processes a stat request from APN VM 302, including how APN VM 302 adjusts a timestamp of minutes reported back to the APN VM 302. Then a description is provided on how the APN VM 302 processes the timestamp in the stats package and maps it to its own timeline. Following the description of timestamp processing is a description on formats of the stats package that is returned and also provides details about how APN VM 302 processes the stats package. Information regarding bandwidth requirements to support stat polling follows.

The APNA stores stats in tables that have the basic structure show in exemplary Table 3. The Timestamps in this table are recorded in seconds, though other units of time, such as milliseconds (ms), may suitably be used. Since a data plane app, such as data plane app 342, on each APNA may be configured to execute an APN VM 302 stats poll by writing statistics into the NMS_stats database on a periodic basis, such as every minute. As a result of such poll, the timestamps for each minute are expected to be 60 s apart. In Table 3, the Minute column holds a value that increments by one for each minutes worth of data that the data plane app 342 for each APNA stores, such as the data plan app 342 on APNA 331.

TABLE 3

APNA Stats Schema

| Minute | Timestamp | object | Values of counters, state, . . . |
|---|---|---|---|
| 2 | 1365441657 | path 1 | |
| 2 | 1365441657 | path 2 | |
| 3 | 1365441717 | path 1 | |
| 3 | 1365441717 | path 2 | |
| 4 | 1365441778 | path 1 | |
| 4 | 1365441778 | path 2 | |

If the time on the APNA were to advance by 1 hour after the Minute 3 stats were written, the timestamps would change as shown in APNA Table 4. In the APNA Table 4, the timestamps between Minutes 3 and 4 jumps forward by 3,600 seconds. To account for this situation, it is necessary for the APN VM 302 to map 1365445317 to the APN VM 302 local time. The jump in time of this example could happen if the APN appliance was powered off or disabled for the one hour period of time. The ability of APN VM 302 to distinguish such cases of time jumps, forward or backward, determines how accurate the mapping to APN VM 302 local time can be.

TABLE 4

APNA Stats Schema (Time jumps forward)

| Minute | Timestamp | object | Values of counters, state, . . . |
|---|---|---|---|
| 2 | 1365441657 | path 1 | |
| 2 | 1365441657 | path 2 | |
| 3 | 1365441717 | path 1 | |
| 3 | 1365441717 | path 2 | |
| 4 | 1365445317 | path 1 | |
| 4 | 1365445317 | path 2 | |

If the time on the APNA, were to be set backwards one hour after the Minute 3 stats were written the timestamps would change as shown in Table 5. In the APNA Table 5, the timestamps between Minutes 3 and 4, jumps backward by 3,600 seconds. To account for this situation, it is necessary for the APN VM 302 to map 1365438117 to the APN VM 302 local time.

TABLE 5

APNA Stats Schema (Time jumps backward)

| Minute | Timestamp | object | Values of counters, state, . . . |
|---|---|---|---|
| 2 | 1365441657 | path 1 | |
| 2 | 1365441657 | path 2 | |
| 3 | 1365441717 | path 1 | |
| 3 | 1365441717 | path 2 | |
| 4 | 1365438117 | path 1 | |
| 4 | 1365438117 | path 2 | |

A function TS(m) is defined which returns a timestamp value from the APNA stat database of minute (m).

APNA stat request message processing is described next. The APNA makes a guarantee to the APN VM 302 that all of the stat minutes in a report are consecutive minutes with no jump in time. For each appliance, APN VM 302 maintains the following state information:

S—the appliance's timestamp on the latest minute, $S_{Latest}^{LastPoll}$, that APN VM 302 has received. At the end of every poll cycle, the latest epoch received from the APNA is stored as the last timestamp. It is noted that this value is not mapped to the APN VM 302 system time, since this value is sent back to the APNA to pick up at the previous point of polling. The goal of storing the latest timestamp is to allow for a comparable value to make sure that repeat data is not received and to allow for a determination to be made whether the minute counter has been reset on the APNA. When data is collected, all data for all objects is received within the same group of minutes, so the latest timestamp for all objects is the same. This is initialized to 0. A value of 0 is used when there is no knowledge of the latest minute from an appliance. Typically, this only occurs when the appliance has never been polled before.

M—the appliance's minute counter on the latest minute, $M_{Latest}^{LastPoll}$, that APN VM 302 has received. This is initialized to 0. "M" is processed in a similar manner as described above with regard to "S".

Each time APN VM 302 requests stats from the appliance it requests N minutes worth of statistics. If the network management system (NMS), APN VM 302, is polling for stats every five minutes, then N=5 will be typical. Generally, the number of minutes requested, N, is dictated by the mode of polling. If APN VM 302 is in stats polling catchup, N is set equal to 4*polling interval, not to be less than 15 or greater than 60. If stats are in sync, N is equal to the polling interval. The NMS uses larger values of N if it sees that it needs to catch up with a large number of minutes.

When APN VM 302 triggers a request for stats from an APNA, APN VM 302 accesses the current APN VM 302 time and stores it in the variable $t_n$. The NMS or appliance monitor then sends a message which says, "APN VM 302's time is $t_n$ and this request is for N minutes of statistics that occur after $M_{Latest}^{LastPoll}$ and $S_{Latest}^{LastPoll}$." When storing these values, they are maintained in the APNAs local frame of reference. Since $M_{earliest}$, $M_{latest}$, and $M_{max}$ and $S_{earliest}$, $S_{latest}$, and $S_{max}$ are returned from a current poll, $M_{Latest}^{CurrentPoll}$ replaces $M_{Latest}^{LastPoll}$ and then depending on currentrules or requirements, APN VM 302 renames it to $M_{Latest}^{LastPoll}$. Same for $S_{Latest}^{LastPoll}$. Generally, these metrics are not stored as files or objects to be renamed. The appropriate managed appliances table columns are updated with the new values. This message is written as the tuple $\{t_n, N, M_{Latest}^{LastPoll}, S_{Latest}^{LastPoll}\}$. When the APNA returns a stat report, it includes the following fields, along with the actual statistics:

$t_n$—current APN VM 302 time value sent in the request message $t_a^{PNA}$—the appliance timestamp when the message was received.

N—the number of minutes N of data requested, also noted as $N_{requested}$, and sent in the request message $N_{actual}$ the actual number of minutes returned in the report. The APNA guarantees that $N_{actual} \leq N$ $M_{Earliest}^{CurrentPoll}$, $S_{Earliest}^{CurrentPoll}$—The earliest minute counter $M_{earliest}$ and earliest timestamp $S_{earliest}$ in this report.

$M_{Latest}^{CurrentPoll}$, $S_{Latest}^{CurrentPoll}$—The latest minute counter $M_{latest}$ and latest timestamp $S_{latest}$ in this report.

$M_{max}^{CurrentPoll}$, $S_{max}^{CurrentPoll}$—The latest minute counter $M_{max}$ and timestamp $S_{max}$ in the APNA database that is current with the $t_a^{APNA}$ when the message was received or $t_a^{\Delta rAdjusted}$, $M_{max}$ and $S_{max}$ are determined at the time the values are needed. In an alternative embodiment, the values are updated in the APNA database every time a new minute sample is gathered on the APNA. Essentially every 60 seconds.

The NMS determines other values which include:

$t_a^{\Delta rAdjusted}$—the appliance timestamp when the message was received and then adjusted. The APNA time $t_a^{APNA}$ has been adjusted by $\Delta_r$ since the latest sample in this report was taken. $\Delta_r$ is described further below and calculations involving $\Delta_r$ are determined on the NMS.

$\Delta_r$—The time delta of the stat report. The basic approach is that the difference between NMS time and APNA time is used to determine a raw clock difference. Then, $\Delta_r$ is used to determine whether historical data samples need to be adjusted based on time gaps and if so how to make the adjustment. The time difference delta $\Delta_r$ is between the expected sample time on the appliance $t_{a\text{-}expected}$ minus the current sample time on the appliance at time $t_a^{APNA}$ based on the number of minutes that have elapsed since $M_{Latest}^{LastPoll}$ and the time deltas between any gaps in minute samples. This is used by the NMS to correct for time jumps that have occurred on the APNA. A value of 60 minutes would mean that the APNA time has been artificially adjusted forward 60 minutes between the time that $M_{Latest}^{LastPoll}$ was sampled and the time the report request was received. It is noted that all data reported in any one stat report is guaranteed by the APNA to be sequential with no gaps represented in the data. A gap in the data terminates a report at the gap, which means that the number of minutes returned is less than N. This approach is taken so that a single stat report does not need to have the time stamps adjusted based on multiple frames of reference, such as reporting multiple values for $\Delta_r$. $\Delta_r$ represents the time adjustments internal to the data in the stat report caused by gaps in the samples between the time of the samples being gathered and the current time. $\Delta_r$ is the sum of adjustments for all gaps in the data. As described herein, gaps can occur for two reasons:

The system clock changed: This is determined from linearly incrementing minute counters as compared to timestamps that do not increment by exactly 60 seconds. When this happens, samples before the clock change must be reported as if the clock had not been changed; therefore $\Delta_r$ is adjusted by a difference in expected time stamp values between the minute preceding the gap and the minute of the gap. So, where $t_n$ represents the appliance timestamp of the minute of the gap and $t_{n-1}$ represents the minute preceding the gap:

$$\Delta_r = \Delta_r + (t_n - (t_{n-1} + 60))$$

The APNA system was offline or otherwise incapable of gathering data: When the system comes up and starts gathering data, a guarantee is adhered to that the next minute counter is at least 2 minutes greater than the last minute counter, meaning the minute counter can be said to not increment linearly when the system has stopped gathering data for any reason. When this happens, it is assumed that the system clock was not affected and therefore no adjustment to timestamps preceding the gap need to be made. This assumption is required because the system would otherwise have no frame of reference from which to determine the time relative to the current time that data was collected.

The message response basically says, "At $t_n$ APN VM 302 time ($t_a$ APNA time), a request was received for N minutes of stats that occurred after $S_{Latest}^{LastPoll}$ and $M_{Latest}^{LastPoll}$." Included in the response from this APNA are $N_{actual}$ minutes whose earliest time stamps are $M_{Earliest}^{CurrentPoll}$, $S_{Earliest}^{CurrentPoll}$ and whose latest time stamps are $M_{Latest}^{CurrentPoll}$, $S_{Latest}^{CurrentPoll}$. This APNA has up to $M_{max}^{CurrentPoll}$, $S_{max}^{CurrentPoll}$ minutes available. The max values are the latest from APNA database. These values are not equal to current poll Max values if there is additional data to be gathered, such as may occur if the NMS is in catch up mode or a gap occurs and need to request for data occurring after the gap is required. The APNA's time $t_a$ is adjusted by $\Delta_r$ since the latest sample in this report was taken in response to the last successful poll. The APNA calculates $\Delta_r$, returns the min/max values of the report, the max values in the database, and returns the values passed to it from the APN VM 302. The APN VM 302 performs the other calculations and adjusts timestamps in the data prior to committing the data to the NMS_Stats database.

When the APNA is polled and receives the request message, it grabs the current time, stores it as to and stores this time with the message. The APNA then calculates the range of data that is to be returned. In no case does the APNA return more than the requested N minutes worth of data, though it could send fewer. The APNA searches in the APNA database stored in local storage 336 and sets $S_{max}$ to the largest available timestamp and $M_{max}$ to the largest available minute counter found in the APNA database. $S_{max}$ and $M_{max}$ are not explicitly stored in the APNA database. They are learned, or inferred, by searching for the max values in the minutes table. In an alternative embodiment these values are stored in a database and updated every minute when a statistics sample is created. The APNA's values of $M_{max}$ and $S_{max}$ are then compared against $M_{Latest}^{LastPoll}$ and $S_{Latest}^{LastPoll}$ are used to determine the starting range of the data to be returned based on, $M_{earliest}$ and $S_{earliest}$. $M_{earliest}$ and $S_{earliest}$ are the least possible values such that $M_{earliest} > M_{Latest}^{LastPoll}$ and $S_{earliest} > S_{Latest}^{LastPoll}$. If no such value exists, then the minutes must have been reset and the earliest values in the database are used. It is noted that $M_{earliest}$ and $S_{earliest}$ are determined by finding the first minute in the minutes table and its corresponding timestamp in the APNA database. Table 6 below shows the meaning of possible outcomes of the comparison.

If $M_{Latest}^{LastPoll}=M_{max}^{CurrentPoll}$ and $S_{Latest}^{LastPoll}=S_{max}^{CurrentPoll}$, then there are no more minutes available in the database and an empty stats report is returned.

If $M_{Latest}^{LastPoll}<M_{max}^{CurrentPoll}$ and $S_{Latest}^{LastPoll}\leq S_{max}^{CurrentPoll}$, then this is probably the normal case where the APNA has gathered additional stats data since the last poll. This will result in $M_{Earliest}^{CurrentPoll}$ and $S_{Earliest}^{CurrentPoll}$ being set to the first minute that occurred after M.

If $M_{Latest}^{LastPoll}<M_{max}^{CurrentPoll}$ and $S_{Latest}^{LastPoll}<S_{max}^{CurrentPoll}$, then the time on the APNA has likely been adjusted backwards since the last NMS poll. This will result in $M_{Earliest}^{CurrentPoll}$ and $S_{Earliest}^{CurrentPoll}$ being set to the first minute that occurred after M.

For the other cases, APN VM 302 is considered to have gotten out of sync with the APNA. This can occur in at least the following cases:
- APNA was replaced, due to a return material authorization (RMA) replacement
- APNA software was reinstalled, which in current applications cause the minute counter to reset.
- A configuration update which triggered a database archive was done, which in current applications cause the minute counter to reset.
- Any of the above was done while time was also changed on the APNA.

For each of these scenarios, it is concluded that the APN VM 302 does not have any of the stats that are available in the APNA database.

TABLE 6

Timestamp comparisons

| $M_{Latest}^{LastPoll}$ vs $M_{max}$ | $S_{Latest}^{LastPoll}$ vs $S_{max}$ | Reason |
|---|---|---|
| = | = | NMS has requested a report before the APNA has acquired new data |
| = | > | Appliance was replaced or stat data was reset. The NMS has none of the data available on the appliance. |
| = | < | Appliance was replaced or stat data was reset. The NMS has none of the data available on the appliance. |
| < | = | Appliance was replaced or stat data was reset. The NMS has none of the data available on the appliance. |
| < | < | Looks normal. The appliance has newer data available. It is possible that time on the appliance has been adjusted backwards. |
| < | > | The time on the appliance has been adjusted backwards. |
| > | < | Appliance was replaced or stat data was reset. The NMS has none of the data available on the appliance. |
| > | = | Appliance was replaced or stat data was reset. The NMS has none of the data available on the appliance. |
| > | > | Appliance was replaced or stat data was reset. The NMS has none of the data available on the appliance. |

At this point in the processing, the APNA knows the first minute in the range of stats that will be returned to the NMS. The APNA determines the last minute in the range. Since the APNA knows that the NMS expects to receive N minutes, the APNA attempts to achieve that by setting $M_{latest}$=MIN($M_{earliest}$+N−1, $M_{max}$). This provides N minutes if that many are available, else it provides data up to the last available minute. The value of N−1 comes from the fact that the data is zero indexed. So, for example for a start at minute M and a request for N minutes, the max minute which can be returned is minute M+(N−1). The APNA then sets $S_{earliest}$ to the timestamp corresponding to Retest. In most cases, this works fine but there is a problem because it deals poorly with changes in time on the APNA. Stats are requested in chunks to reduce the amount of data gathered from the APNA and applied on the APN VM. Without these limitations, excessive CPU and disk I/O resources may be used when gathering or applying data. On an appliance, using excessive resources impacts the ability to process and forward packets.

The APNA makes a guarantee to the NMS that all of the stat minutes in a report are consecutive minutes with no jump in time. The APNA can check the timestamps for the minutes in the range of $M_{earliest}$ to $M_{latest}$ and look for time gaps shorter or longer than 1 minute. If a time discrepancy is seen, $M_{latest}$ gets modified to point to the last minute for which the timestamps are in correct consecutive order. For example, if the database looks like Table 3 and the NMS asked for the 5 minutes after minute 1, the APNA would set $M_{Earliest}^{CurrentPoll}$=2 and $M_{Latest}^{CurrentPoll}$=3. The APNA cannot use 4 as $M_{Latest}^{CurrentPoll}$ because the gap between the timestamps of minutes 3 and 4 is one hour instead of 1 minute.

Each APNA must also calculate the time offset, $\Delta_r$, to report to APN VM 302 the time shifts that have occurred since $M_{Latest}^{LastPoll}$. This is done by looking at the current poll data in each APNA for each minute previous to $M_{Latest}^{CurrentPoll}$ and determining if the time gap between that minute and the previous minute is greater than 60 seconds. If so, the delta between the earlier minute and the later minute minus one minute is added to $\Delta_r$. In more formal mathematical as calculated on each APNA:

Let $M_r=\{M_{latest}, \ldots, M_{max}\}$ and let $m_i$ designate the $i^{th}$ element of $M_r$.

Initialize $\Delta_r \leftarrow 0$.

for each $m_{i-1}, m_i$ in $M_r$ such that $TS(m_{i-1})+60 \neq TS(m_i)$ and $m_{i-1}+1=m_i$ $\Delta_r \leftarrow \Delta_r + TS(m_i) - TS(m_{i-1}) - 60$ This calculation takes advantage of the fact that if the data plane app 342 gets restarted for any reason, it will leave a gap in the minute column. So if the stats database has consecutive minute counters ($m_{i-1}+1=m_i$), then it is known that the data plane app 342 was running and collecting stats the entire time. Therefore, any discrepancy in the timestamp is due to a change in time during that minute. It is explicitly assumed that if there is a gap in the minute column ($m_{i-1}+1 \neq m_i$), then the time has not changed. Since these calculations are done on an APNA and there is a gap in the minute column, then the APNA system clock has not been altered. if there is a gap in minutes, there is no way of knowing how long APNA was not gathering statistics. Without that context, it can't be known if the APNA clock changed during the interval for which there are no statistics. Because of this, it is assumed that the clock was not changed to make the other math more reasonable. Even if some data is not accurate as a result, the algorithm as a whole recovers within one polling interval, provided there are no other intervals in which the system did not gather statistics and the clock was changed.

As discussed above, while this assumption on the clock may not be true, as a user could have changed the APNA system clock while stats were not being gathered, there is no way for the APN VM system to detect this. This does not have any serious long term consequences, though. It just means that a small number of stats samples could be put at the wrong time in the APN VM 302 timeline. Data after the gap is adjusted to the correct relative time allowing the system to self-correct, assuming no more gaps exist where stats were not being gathered and the system clock was altered.

This section defines how APN VM 302 processes a stat report received from an APNA. The start report package contains timestamps for the minute samples that are local to the APNA that generated the report. APN VM 302 must convert those timestamps into a time value that is local to the APN VM 302. Since each APNA guarantees that the minute samples in the report come from consecutive minutes and that there was no time adjustment made between any of the samples, APN VM 302 needs to calculate only a single time offset $\Delta$ to apply to all of the timestamps in the report package.

APN VM 302 calculates an initial $\Delta$ based on the values $t_n$ that are associated with the APN VM 302 time when the request message was sent and $t_a^{ArAdjusted}$ that is associated with the APNA time when the request message was received and adjusted by $\Delta_r$ in the report. This provides an offset of the current clocks of APN VM 302 and the APNA without compensating for network or packet processing delay. This is acceptable given that these values are small, generally measured in milliseconds, and this time calculation of the initial $\Delta$ simply requires minute accuracy.

This initial $\Delta$ may not be as accurate as it could be because it describes the clock offset that exists currently and not the time offset that existed when the minute samples in the report package were recorded. APN VM 302 needs to know all of the other time adjustments that have happened between the time the samples were recorded and $t_a^{APNA}$ so that it can adjust the initial $\Delta$. This time adjustment information is encoded in $\Delta_r$. APN VM 302 then calculates $\Delta$ as:

$$\Delta = t_n - t_a^{APNA} - \Delta_r$$

APN VM 302 then converts a sample time from an APNA, $S_a$, to the sample time in the APN VM 302 time frame, $S_n$, with the equation $S_n = S_a + \Delta$.

After calculating $\Delta$, APN VM 302 starts processing the object and minute files in the package. The stat report package has data about a variety of object types. Each object type has an object file which lists names and object ids of all of the objects which have data in the report. There is also a minute file for each object type which lists the counters and states for each object id and minute.

APN VM 302 processes each object type beginning by first reading the objects from the object file. For each object, APN VM 302 uses the object's name information to check for that object in the NMS_Stats database in datastore 304. If the object exists, APN VM 302 retrieves the object ID from the database and sets up an in-memory table that maps the APNA ID to the APN VM 302 ID. If the object does not exist, a new ID is created and that object is added to the NMS_Stats database. The in-memory table is then updated with the new ID mapping. APN VM 302 then processes the minute counter values, the indicated timestamps, for the object. The object ID in the minute file is converted to the APN VM 302 ID based on the in-memory table and then the timestamps for each minute record for the object are updated based on the calculated $\Delta$ value. APN VM 302 also maps the counter names in the minute file to the column names in the database. After all the mapping is done, the stats are stored in the database.

The process of adding stats to the database is done as part of a transaction. This allows all the stats from a stat report package to become visible to the rest of APN VM 302 at one time. The stat report package is a zip file that contains 4 major items, including a manifest file, an APNA events file, object files grouped by object type that contain objects having stats in this report, and stats files grouped by object type for the objects in this report.

The manifest file is in the root of the stat report and contains information about the stats package. The manifest file is formatted as a text file where each line contains a single <name>=<value> pair. Whitespace is allowed around the = sign and is ignored. Any <name> field that contains an unknown <name> is ignored. Table 7 lists the supported <name> fields.

TABLE 7

Valid name fields in the Manifest file

| Name | Notes |
|---|---|
| sitename | |
| appliance_id | |
| last_minute_reported | The last minute that APN VM 302 knows about (M above) |
| last_timestamp_reported | The timestamp of the last minute that APN VM 302 knows about (S above) |
| last_event_reported | The id of the last event in that APN VM 302 has received |
| report_request_time | The APN VM 302 timestamp when this report was requested ($t_n$ above) |
| duration_in_minutes | The amount of minutes requested by APN VM 302 |
| appliance_timestamp_at_request | The APNA timestamp when the request for this report was received ($t_a$ above) |
| earliest_minute | The earliest minute in this report ($M_{earliest}$ above) |
| earliest_epoch_time | The timestamp of the earliest minute in this report ($S_{earliest}$ above) |
| latest_minute | The latest minute in this report ($M_{latest}$ above) |
| latest_epoch_time | The timestamp of the latest minute in this report ($S_{latest}$ above) |
| max_minute | The largest minute the APNA has in the database ($M_{max}$ above) |
| max_epoch_time | The timestamp of the largest minute the APNA has in the database ($S_{max}$ above) |
| report_delta | Corresponds to $\Delta_r$ above |
| unreported_minutes | Number of minutes after latest_minute that are available in the APNA database |
| new_max_event_id | The id of the last event in this package |

The APNA events are stored in the events/events.csv file which is a text file where the first line is a header that names the fields available for each event with each field name separated by commas as shown in Table 8. Each subsequent line represents an event and the fields of the event are separated by a comma. The order of the fields of the event follow the order in the header line. The APN VM 302 ignores any unknown fields

TABLE 8 describes the valid Event fields.

| Event Field | Notes |
|---|---|
| id | APNA identifier of the event |
| epoch_time_ms | APNA timestamp of the event |
| object_name | Name of the object with this event |
| object_id | APNA identifier of the object with this event |
| object_type | The type of object with this event |
| severity | The severity of the event |
| prev_state | On events representing a state change, the old state |
| curr_state | On events representing a state change, the new state. Corresponds to the eventType in the APNA database |
| description | Free text description of the event |

Stats are counters of various events that are associated with some object, like a WAN link or a conduit. The APN VM 302 does not necessarily have a standard configuration that corresponds to the configuration of an existing APN so APN VM 302 does not know in advance what objects exist in the network. The APN VM 302 discovers the objects on the network by looking at the objects reported in the stats package. In the stats/directory of the stats package, each type of object that can have stats has a <object_type>_minutes.csv file and an <object_type>_objects.csv file. The _minutes.csv file is covered in the next section. This section describes the _objects.csv file.

The APN VM 302 knows about the listed object types, including an application type, a class type, a conduit type, a conduit_usage type, an Ethernet type, an internet_service type, an internet_usage type, an intranet_service type, an intranet_usage type, a passthrough_service type, a site type, a virtual_wan_link type, a wan_egress_path type, and a wan_ingress_path type.

The <object type> objects.csv file is a text file where the first line is a header that names the fields available for each object with each field name separated by commas. Each subsequent line represents an object and the fields of the event are separated by a comma. The order of the fields of the object follow the order in the header line. The APN VM 302 will ignore any unknown fields.

Each <object_type>_objects.csv file will have the APNA id of the object and the APNA's name for the object. The APNA id of the object corresponds to an id that is used in the <object_type>_minutes.csv file. The purpose of the APNA id is only to correlate counters in the _minutes file to objects described in the objects file. The APN VM 302 is not allowed to use that APNA id for any other reason or to store the APNA id in its database. The APN VM 302 allocates its own id for each object that it discovers and uses the APN VM object id within its database. This allows the APNA to change id numbers as needed without impacting APN VM 302. The APN VM 302 uses the names of the objects as a key to identify objects. The general rule is this: Objects with the same name are the same thing; objects with different names are different.

Some object_types, like sites and virtual_wan_links, can be easily identified with a single name so those _objects.csv files are generally simple as shown in the example below.

```
root@Dubrovnik_Croatia-European_Union:~# cat site_objects.csv
site_id,site_name
0,Dubrovnik_Croatia-European_Union
root@Dubrovnik_Croatia-European_Union:~# cat
virtual_wan_link_objects.csv
wan_link_id,wan_link_name
2,DB-CBL
3,DB-DSL-X2
4,DB-bypass1-2
```

Other object_types are not that simple, though. For example, a conduit usage object type describes how a conduit service uses a WAN link. In the APNA configuration model, a usage does not have a name. To uniquely identify a conduit usage, both the conduit service name and the WAN link name are required. To identify a conduit service, information is provided that the conduit connects from one site to a different site. This means that the conduit_usage_objects.csv file contains a WAN link name, a conduit service name, and the remote site name in order for APN VM 302 to fully discover the correct conduit usage object. The local site name associated with the conduit is known from a manifest that is part of the stats package and isn't associated directly with the conduits and may be included as shown in the example below. This leads to a conduit_usage_objects.csv file that appears as shown below. Each entry in the example below provides an exemplar of a conduit usage object.

```
root@Dubrovnik_Croatia-European_Union:~# cat
conduit_usage_objects.csv
usage_id,dynamic_conduit,wan_link_id,wan_link_name,
local_site_name,remote_site_name,usage_name
1,0,2,DB-CBL,Dubrovnik_Croatia-
European_Union,Barcelona_Catalunya_Espana_T510_,
Dubrovnik_Croatia-European_Union-Barcelona_Catalunya_Espana_T510_
1,0,3,DB-DSL-X2,Dubrovnik_Croatia-
European_Union,Barcelona_Catalunya_Espana_T510_,
Dubrovnik_Croatia-European_Union-Barcelona_Catalunya_Espana_T510_
1,0,4,DB-bypass1-2,Dubrovnik_Croatia-
European_Union,Barcelona_Catalunya_Espana_T510_,
Dubrovnik_Croatia-European_Union-Barcelona_Catalunya_Espana_T510_
2,0,2,DB-CBL,Dubrovnik_Croatia-
European_Union,MiddleEarth,
Dubrovnik_Croatia-European_Union-MiddleEarth
2,0,3,DB-DSL-X2,Dubrovnik_Croatia-
European_Union,MiddleEarth,
Dubrovnik_Croatia-European_Union-MiddleEarth
2,0,4,DB-bypass1-2,Dubrovnik_Croatia-
European_Union,MiddleEarth,
Dubrovnik_Croatia-European_Union-MiddleEarth
```

The APNA provides an id for conduit usages that is only unique within the scope of a WAN link. The APNA uses both the WAN link id and conduit usage id to identify a usage so those identifiers appear in the conduit_usage_minutes.csv file. This means that the conduit_usage_objects.csv file contains the APNA's WAN link and conduit usage ids.

A close reading of the above output shows that there is a field named dynamic_conduit for each conduit_usage. This is because the type of conduit is part of the identification of the conduit. The APN VM UI 310 treats static and dynamic conduits of the same name as distinct objects so it is necessary to know whether conduit counters were obtained on a static or dynamic conduit. In a similar manner, class objects are identified with the class_type field because the APN VM UI 310 groups class counters by type, such as realtime, interactive, or bulk.

The X_objects.csv file for each object X_type contains enough information for APN VM 302 to fully discover the object X and any dependent objects. One benefit to this is that APN VM 302 does not have to process the X_objects.csv files in any specific order. Each file has all of the necessary information so it has no prerequisites. The only ordering requirement is that APN VM 302 processes <object_type>_objects.csv files before processing a <object_type>_minutes.csv file.

Table 9 lists object types that are included in the stats package and which names and ids are provided for each object.

TABLE 9

Names and IDs by object type

| Object type | Names provided | IDs provided |
|---|---|---|
| application | application_name, dynamic_conduit, local_site_name, remote_site_name | application_index, conduit_id |

TABLE 9-continued

Names and IDs by object type

| Object type | Names provided | IDs provided |
|---|---|---|
| class | dynamic_conduit, local_site_name, remote_site_name, class_type, class_name | class_id, conduit_id |
| conduit_service | dynamic_conduit, local_site_name, remote_site_name, conduit_name | conduit_id |
| conduit_usage | dynamic_conduit, wan_link_name, local_site_name, remote_site_name, usage_name (conduit_name) | usage_id (conduit_id), wan_link_id |
| ethernet | eth_faceplate_name | eth_id |
| internet_service | service_name (<site name>-Internet) | service_id (always 0) |
| internet_usage | usage_name (<site name>-Internet) | usage_id (always 0) |
| intranet_service | service_name | service_id |
| intranet_usage | usage_name | usage_id |
| passthrough_service | service_name (always passthrough) | service_id (always 0) |
| site | site_name | site_id |
| virtual_wan_link | wan_link_name | wan_link_id |
| wan_egress_path | dynamic_conduit, from_wan_link_name, to_wan_link_name, remote_site_name | conduit_id, path_num |
| wan_ingress_path | dynamic_conduit, from_wan_link_name, to_wan_link_name, remote_site_name | conduit_id, path_num |

Similar to the events.csv and <object_type>_objects.csv files, <object_type>_minutes.csv is a text file where the first line is a header that names the fields available for each object with each field name separated by commas. Each subsequent line represents an object and the fields of the event are separated by a comma. The order of the fields of the object follow e order in the header line. The APN VM 302 ignores any unknown fields.

The fields for each object are arranged so that necessary IDs for the object type, as shown in Table 9, are first, then the minute and epoch_time_ms fields are placed which identify the end of the minute that the counters cover, followed by the counter fields. An excerpt of the conduit_usage_minutes.csv file is shown below. The wan_link_id and usage_id fields for each row are enough to correlate the counters to the object names in the conduit_usage_objects.csv file.

root@Dubrovnik_Croatia-European_Union:~#cat conduit_usage_minutes.csv wan_link_id,usage_id,minute,epoch_time_ms,packets_ingress,bytes_ingress,packets_dropped_ingress,bytes_dropped_ingress, bytes_saved_ingress,packets_egress,bytes_egress, packets_dropped_egress,bytes_dropped_egress, bytes_saved_egress 2,1,1501,1417622315000,1561,121616,0,0,0,1676, 142624,0,0,0

3,1,1501,1417622315000,1369,104880,0,0,0,1338, 101552,0,0,0

4,1,1501,1417622315000,1319,76752,0,0,0,1314,76512, 0,0,0

Table 10 lists object types and associated counters.

TABLE 10

Object Type and Associated Counters

| Object type | Counters |
|---|---|
| application | mos (average MOS score), worst_mos |
| class | wait_time_ms, bytes_pending, packets_pending, bytes_sent, packets_sent, bytes_dropped, packets_dropped |
| conduit_service | worst_state, undefined_time_ms, disabled_time_ms, dead_time_ms, bad_time_ms, good_time_ms, packets_transmitted, bytes_transmitted, control_bytes_transmitted, control_packets_transmitted, realtime_bytes_transmitted, realtime_packets_transmitted, interactive_bytes_transmitted, interactive_packets_transmitted, bulk_bytes_transmitted, bulk_packets_transmitted, bytes_received, packets_received, packets_ooo_received, packets_lost_received, latency_bowt_received, max_jitter_received |
| conduit_usage | packets_ingress, bytes_ingress, packets_dropped_ingress, bytes_dropped_ingress, bytes_saved_ingress, packets_egress, bytes_egress, packets_dropped_egress, bytes_dropped_egress, bytes_saved_egress |
| ethernet | bytes_sent, packets_sent, bytes_received, packets_received, link_state, errors |
| internet_service | packets_ingress, bytes_ingress, packets_dropped_ingress, bytes_dropped_ingress, bytes_saved_ingress, packets_egress, bytes_egress, packets_dropped_egress, bytes_dropped_egress, |
| internet_usage | packets_ingress, bytes_ingress, packets_dropped_ingress, bytes_dropped_ingress, bytes_saved_ingress, packets_egress, bytes_egress, packets_dropped_egress, bytes_dropped_egress, |
| intranet_service | packets_ingress, bytes_ingress, packets_dropped_ingress, bytes_dropped_ingress, bytes_saved_ingress, packets_egress, bytes_egress, packets_dropped_egress, bytes_dropped_egress, |
| intranet_usage | packets_ingress, bytes_ingress, packets_dropped_ingress, bytes_dropped_ingress, bytes_saved_ingress, packets_egress, bytes_egress, packets_dropped_egress, bytes_dropped_egress, |
| passthrough_service | packets_ingress, bytes_ingress, packets_dropped_ingress, bytes_dropped_ingress, bytes_saved_ingress, packets_egress, bytes_egress, packets_dropped_egress, bytes_dropped_egress, |
| site | (ingress means wan ingress and egress means wan egress here) bytes_ingress, packets_ingress, control_bytes_ingress, control_packets_ingress, realtime_bytes_ingress, realtime_packets_ingress, interactive_bytes_ingress, interactive_packets_ingress, bulk_bytes_ingress, bulk_packets_ingress, passthrough_bytes_transmitted, passthrough_packets_transmitted, bytes_egress, packets_egress, passthrough_bytes_received, passthrough_packets_received |
| virtual_wan_link | packets_transmitted, bytes_transmitted, control_bytes_transmitted, control_packets_transmitted, realtime_bytes_transmitted, realtime_packets_transmitted, interactive_bytes_transmitted, interactive_packets_transmitted, bulk_bytes_transmitted, bulk_packets_transmitted, bytes_received, packets_received, packets_ooo_received, packets_lost_received, max_jitter_ms_received, latency_bowt_ms_received |

TABLE 10-continued

Object Type and Associated Counters

| Object type | Counters |
|---|---|
| wan_egress_path | worst_state, src_port, dst_port, undefined_time_ms, disabled_time_ms, dead_time_ms, bad_time_ms, good_time_ms, packets_received, bytes_received, packets_ooo, packets_lost, latency_rpl, latency_wlst, latency_bowt, jitter |
| wan_ingress_path | worst_state, MTU, src_port, dst_port, undefined_time_ms, disabled_time_ms, dead_time_ms, bad_time_ms, good_time_ms, packets_transmitted, bytes_transmitted, control_bytes_transmitted, control_packets_transmitted, realtime_bytes_transmitted, realtime_packets_transmitted, interactive_bytes_transmitted, interactive_packets_transmitted, bulk_bytes_transmitted, bulk_packets_transmitted |

Table 11 shows the total amount of data that is transferred to APN VM 302 from the appliances in the APN at each polling interval. In Table 10 the default polling interval of five minutes is used. The stats package reported from each APNA is a zip file and the files within are text files so there is a high compression ratio. For example, in this estimate there is an 80% compression ratio that is based on empirical measurements.

From such empirical measurements, it is shown that a management network that can support 1 Mbps of data can support even the largest amount of APN VM traffic. For large networks having a large number of APNAs, such networks are able to easily sustain 100 Kbps which would be fast enough to handle the APN VM data requirements. Note that the data in Table 11 refers to the total amount of data from the network. Small sites typically generate a very small amount of data to transfer, such as 9-10 KB every 5 minutes.

TABLE 11

Total Report Data Per 5 Minute Poll

| Number of Client Sites | Number of Internet WAN Links | Number of Intranet WAN Links | Number of Conduits Per Site | Total APN data per 5 minute poll (MB) |
|---|---|---|---|---|
| 128 | 3 | 1 | 8 | 10.4 |
| 128 | 3 | 1 | 16 | 19.2 |
| 100 | 3 | 1 | 3 | 3.8 |
| 40 | 3 | 1 | 3 | 1.5 |
| 256 | 3 | 1 | 8 | 20.8 |
| 256 | 3 | 1 | 16 | 38.4 |

Note that this analysis shown in Table 11 includes the statistical data, but not the events that could appear in the stats package. Events are particular items of interest that have occurred on a specific object at a specific moment in time. For example, a conduit state changing from GOOD to BAD or a software package being installed. This is because it is difficult to predict how many such events may occur because that total does not scale with the number of objects in the configuration. The number of events typically grows based on the quality of the network. Flapping of paths in a network could cause extremely large numbers of events in a 5 minute period. The APNA bounds how many events it places in the stats package to keep this constrained. For example, a bound of 1000 events would add at most 12 KB to the size of the report package.

When APN VM 302 processes a stat report as part of the normal polling of an appliance, the APN VM 302 inspects the unreported_minutes field of the manifest file. If that value is non-zero, then it knows that the normal polling has gotten behind in accessing data for this appliance. The APN VM 302 then transitions to a catchup mode by quickly scheduling a request for another stat report instead of waiting for the next poll interval to expire. In catchup_mode, the number of minutes requested is defined to be 4*N, up to a maximum of 60 minutes. While in catchup_mode, APN VM 302 keeps scheduling polling requests until it sees that the unreported_minutes becomes 0. At no point does the APN VM 302 issue concurrent stat report requests to an appliance.

To communicate with appliances, the APN Manager 358 utilize a middleware layer of software that provides a framework to build applications using remote procedure calls (RPC). Such a middleware layer of software may be a software package such as Apache Thrift™, also referred to more simply as Thrift, which is an open-source middleware software hosted by developer Apache Software Foundation. Thrift, or an alternate middleware layer of software of similar capabilities, provides an interface that allows the APN manager 358 to send messages to and get responses from APN appliances (APNAs) with simple function calls. Such Thrift interface or Thrift-like interface is specified to support use of a secure sockets layer (SSL) cryptographic protocol as a transport mechanism so that all traffic over the management network 326 is encrypted.

For present purposes, it is considered sufficient to state that the use of Thrift-like software involves the use of an interface definition file to formally specify the messages between the systems. Thrift, for example, has a compiler which converts the interface definition into the C++, and other languages, data structures and functions necessary to communicate.

To initiate collecting of stats from an APNA, APN VM 302 calls a gather_apna_stats_report application programming interface (API) defined in the interface definition file. This function is defined as:

StatsDbList gather_apna_stats_report(1: i32 last_minute_reported, 2: i64 last_timestamp_reported, 3: i64 last_event_reported, 4: i16 duration_minutes, 5: i64 report_request_time) throws (1: not_authenticated nologin, 2: ex_stat_creation ex)

The report_request_time, duration_minutes, last_minute_reported, last_timestamp_reported, and parameters correspond to the tuple $\{t_n, N, M_{Latest}^{LastPoll}, S_{Latest}^{LastPoll}\}$ described above. This function has the APNA create a stats report package covering the requested time period. The return value of the call is a StatsDbList which is defined as:

```
struct StatsDbReport {
    1: string file_name.
    2: i32 file_size,
}
struct StatsDbList {
    1: string stats_directory,
    2: list <StatsDbReport> report_list
}
```

These returns provide a list of report file names and sizes to APN VM 302.

To access the contents of the stats package, APN VM 302 uses a get stats file chunk call to retrieve byte ranges of the file. This function is defined as:

FileChunk get_stats_file_chunk(1: string file_name, 2: i32 chunk_offset, 3: i32 chunk_size) throws (1: not_authenticated nologin, 2: file_not_found nofile)

The file_name parameter is the file_name as returned in StatsDbList above. The chunk_offset describes the offset (0 based) to return and the chunk_size is the size, in bytes, of the chunk. So chunk_offset=1, chunk_size=100 would request bytes 100 through 199 of the file. Since APN VM 302 knows the size of the file, since the file size was returned in StatsDbList, APN VM 302 repeatedly issues get_file_chunk until it has received all of the data. The chunk_size does not have to limit itself to a network packet size as the interface definition file streams the data as necessary. Currently, APN VM 302 uses a chunk size of 2 Mb. A stats package is generally much smaller than this.

When APN VM 302 has retrieved the entire stats report package, it calls delete_apna_stats_report to signal the APNA to delete the stats report package. This means the APNA does not have to keep any state about whether APN VM 302 has accessed a stats package since the prior history of each APNA is kept in APN VM 302. This function is defined as:

void delete_apna_stats_report(1: string file_name) throws (1: not_authenticated nologin, 2: file_not_found nofile)

The APNA also provides the APIs get_available_stats_data and get_apna_stats_list to return information about what stats are available in the database and what stat report packages are present.

The APN databases are used to store configuration information, status information, and historical statistics and events that have been collected from all the appliances that APN VM 302 manages. These APN databases store data in tables in data partitions of datastore 304 as described in more detail below.

The statistics database and events database are populated by the polling process in the APN VM 302. This polling process communicates with each of the managed appliances in the network requesting blocks of multiple minutes of data which are synchronized and correlated with the APN VM 302 time and stored in the APN VM databases. In addition to APN VM 302 time synchronization, a local APN VM identification (ID) is given to each of the objects, such as sites, conduits, paths, WAN links, and other network elements and the polling process manages the mappings of APN VM IDs to objects and saves this in the APN VM 302 statistics and events database.

A statistics database, supporting the display APN application, stores and maintains statistics data from all managed appliances (APNAs) in the APN. For example, statistics data supporting APN VM displays for reports, graphs, and network maps are accessed from the statistics database.

One year of history for up to N sites, such as up to 256 sites, allows a user to view trends, zoom in and compare events from any time-period during the previous year of data, and provide a histogram of events for a specified time period.

The statistics database is unified with the naming convention identifying configuration information. By including this configuration information into the database, the database supports APN configuration updates without having to archive and restart the statistics database.

The APN VM 302 has a separate configuration and statistics database that links data according to at the object IDs and names. As a result, an APN configuration update can change object names and IDs, resulting in the updates to the statistics database and configuration database. For APN VM 302, the databases adapt across configuration updates and APN VM processes continue with the new data allowing for data visualization across all APN VM time values (system time values) stored in the databases.

As a result of configuration updates, new sites may be added and old ones removed, and associated conduits, paths, WAN links, and the like are also adjusted according to the change. The databases are designed to support these types of configuration updates by storing the naming and id information persistently for objects in a history storage of the databases, but only storing minute/hour data when the objects actually exist in the network. This approach allows for viewing of objects that existed in the past, but do not exist in the current database, such as a removed or added site for example.

By pre-calculating and storing aggregated hour data based on the minute data that is collected from the appliances allows improved performance of APN VM graphing, network map preparation and display, and updating of reports display screens. For example, when large time ranges are selected for display, having the aggregated hour data already available significantly reduces the time to retrieve and analyze information from the APN VM databases. Also, the events database is an aggregate of all events on every managed appliance in the APNA that APN VM 302 is managing. Various APN VM configurations, user/workspace information, and status information are stored in the APN VM databases.

When a new software version is installed, there may be new tables of statistics or new columns added in existing tables. APN VM 302 retains older data and display reports and graphs on objects and properties that are still valid in a current software release. APN VM 302's retention of the older data prevents loss of data that would normally be thrown away during news software installations.

Both the APN VM statistics and events databases are a combination of all the statistics and events from each of the appliances managed by the APN VM software. Blocks of data may be requested by APN VM 302 from each of the appliances based on time stamps. When these blocks are received, the timestamps are synchronized with the time on APN VM 302 and stored in the statistics and events databases as appropriate.

Tables of counters are defined for the statistics database. For each of the listed data types, generally three database tables are created. For example, a first table contains the id→name mapping, a second table contains a listing of synchronized <type>_minutes for various objects tracked, and a third table contains a listing of <type>_hours containing the aggregated and synchronized hour data from the managed appliances. In each of the "minutes" and "hours" tables, there are two UINT32 values which are an object_id and an update_epoch_time_s which together form a primary key for these tables. Having a short key provides for fast query performance. Specifics of the data fields include:

The Minutes/Hours tables have two UINT32 values which together form a primary key for the associated table
  id—the object identification (ID)
  update_epoch_time_s—the timestamp for the table identified sample
The ID and update_epoch time also provide an index and an inverse primary index to all the Minutes and Hours tables.
The update_epoch_time_s is the time at the end of the minute or hour in coordinated universal time (UTC)—as synchronized to the APN VM 302 system clock.

Hours tables have an additional field 'minutes' which represents the number of minutes of data in that hour—typically the latest hour does not contain the complete 60 minutes. Other hours can have less if that particular object was deleted due to a configuration update in the middle of an hour.

Additionally these tables contain counters of packets and bytes for ingress and egress which are typically 64 hit integers and represent the counts of bytes or packets on that object for the minute ending at the update_epoch_time_s.

Several tables have a 'state', 'worst_state', or 'link_state' field which represents the worst state for that object during the minute, such as GOOD, BAD, DEAD, DISABLED, UNKNOWN.

Latency best one way time (BOWT)—the latency measured BOWT for a conduit or path packets_ooo—the number of packets out of order (ooo) during the time sample max_jitter—the maximum jitter value during the time sample packets_lost—the number of packets lost during the time sample mismatched packets—the number of mismatched packets mismatched bytes—the number State time values—amount of time in milliseconds that the object was in each of the following states: UNKNOWN, DISABLED. DEAD, BAD, and GOOD Maximum transmission unit (MTU)—the measured MTU when the time sample was made.

Congestion count—Whether or not the WAN link or usage is in the congestion state.

Figure 4C:
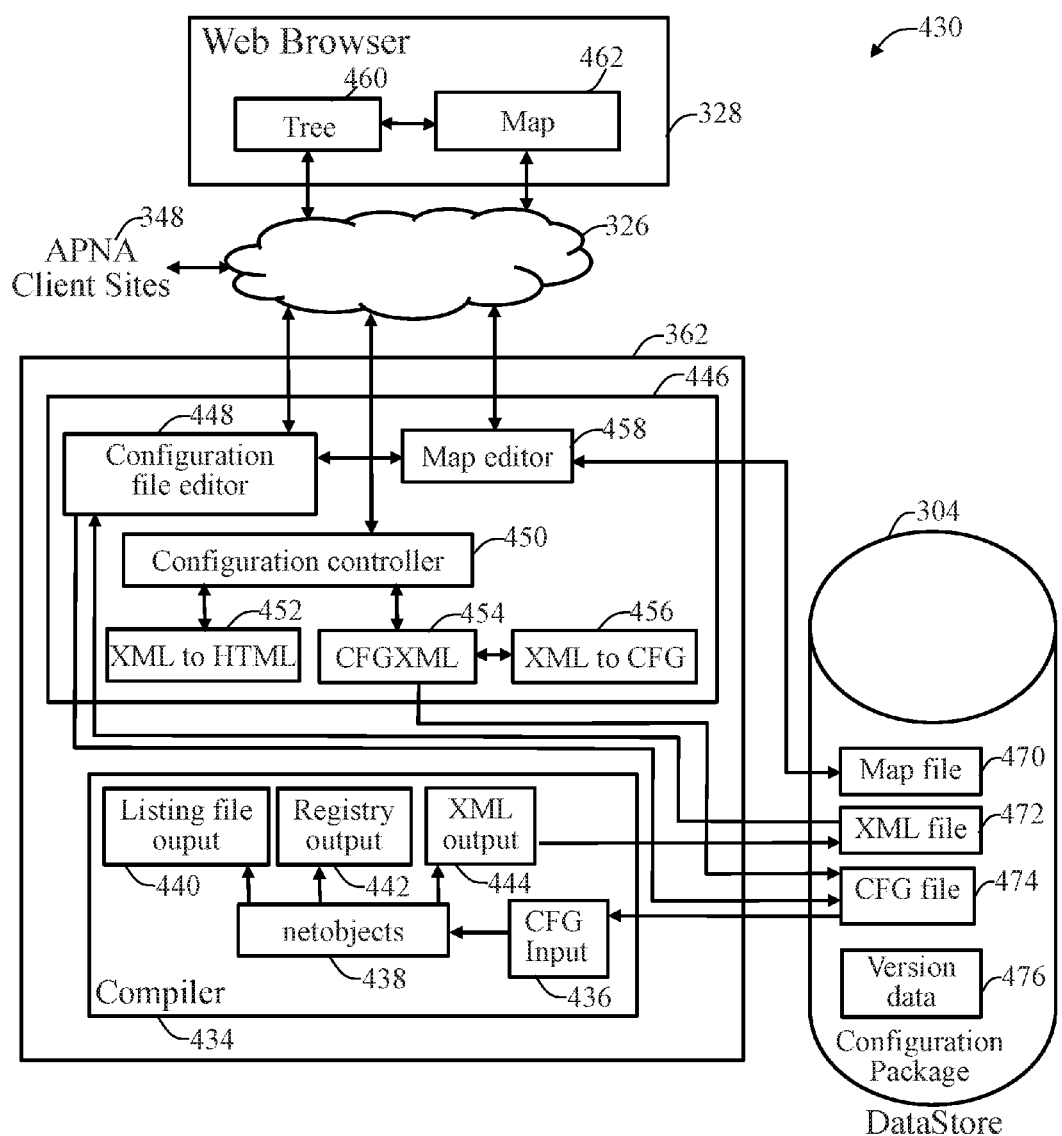
FIG. 4C illustrates an onboard configuration system according to an embodiment of the present invention.

Average permitted rate ingress/egress—runtime calculated permitted rate on a WAN link or conduit usage on ingress or egress. This is dynamic and different from the fair rate seen in the configuration editor. This rate is the actual rate allocated to WAN link or conduit usage. This rate can change based on how much traffic is actually go through the WAN link for each conduit using that WAN link. This is different from the fair rate shown in configuration editor which is a fixed value FIG. 4C illustrates an onboard configuration system 430 according to an embodiment of the present invention. The onboard configuration system 430 comprises an onboard configuration facility package 362, a management network 326, and web browser 328. Elements appropriate for facilitating the onboard configuration system 430 are described herein but the elements are not limited to this description, such as illustrated in FIG. 3. The onboard configuration facility package 362 comprises a configuration compiler 434 and web backend code 446. The compiler comprises a configuration (CFG) input 436, a netobject facility 438, a listing file output 440, a registry output 442, and an extensible markup language (XML) output 444. The web backend code 446 comprises a configuration file editor 448, a configuration controller 450, an XML to HTML generator 452, a configuration XML mapper (CFGXML) 454, an XML to CFG generator 456, and a map editor 458. The web browser 328 comprises a tree facility 460 and a map facility 462. The datastore 304 comprises a map file 470, an XML file 472, a CFG file 474, and a version data file 476. The CFG Input 436 is a block capable of reading and interpreting the structure of a CFG file. The configuration controller 450 is an APN VM block that handles all interactions between APN VM 302 and hamlet browsers. The XML to CFG block 456 is a process which converts the APN VM readable XML configuration to a compiler readable text configuration. The XML to HTML block 452 is a process which converts the APN VM readable XML configuration to an Internet browser readable HTML format. The map block 462 is an XML file that describes the coordinates of sites on a canvas or Cartesian plane and the display settings for the map. The XML file 472 is a text file containing an XML representation of an APN configuration. The CFG file 474 is a text file containing a regular language representation of an APN configuration. The version data block 476 is a text file containing comma separated values representing the edit history of a CFG file. The tree facility 460 couples with the map facility 462, for which trees and maps are drawn in the browser within the context of the configuration editor. The onboard configuration file editor 448 is a component of the onboard configuration facility included in the and web backend code 446 that represents an APN configuration as a hypertext markup language (HTML) tree and accepts changes to the APN configuration from a user. The onboard configuration file editor 448 is closely coupled with the configuration compiler 434 to make changes to the configuration HTML tree. The onboard configuration file editor 448 also integrates with a network map editor 458 to display site nodes in a map representation of the APN.

The APN VM 302 provides a web-based APN VM UI 310 that allows APN configuration packages to be created and modified. This UI provides the ability to create and edit the APN configuration CFG file 474 as well as any network maps stored in the map file 470 that correspond to the stored CFG files. The onboard configuration facility gets packaged so that it can run on an APNA or the APN VM 302.

The compiler 434 takes an APN configuration file and converts it into a representation of the object model that the onboard configuration file editor 448 can work with. The network map editor 458 integrates with the onboard configuration file editor 448 to allow site nodes from the editor to be displayed and positioned on the map.

The onboard configuration file editor 448 leverages the Java™ compiler software to validate a configuration and create output files, including listing file output 440, registry output 442, and XML output 444 that provides representations of the object model.

There are two major components of the UI, the code, such as JavaScript™ code, for example, that runs in the browser, such as browser 328, and the Web backend code 446 that runs on the server, such as the processing node 303. The JavaScript™ code is responsible for handling graph tree navigation and generating requests to the server running the APN VM 302 when a user wants to view or modify items in the configuration. The Web backend code 446 takes requests from the browser, makes necessary updates to the configuration file, and interfaces to the compiler to get the updated object model.

A graphical user interface (GUI) of the onboard configuration file editor 448 displays the network configuration using three tree structures. The trees are labeled sites, connections, provisioning. The sites tree describes basic parameters of a site, such as the Ethernet interfaces, high availability (HA), site name and model, available WAN links, and IP addressing. The connections tree describes how sites are connected to each other with conduits, the rules and classes for the conduits, and whether the sites connect to the Internet and internal intranets. The provisioning tree describes how the services defined in the connections tree are to utilize the bandwidth of the available WAN links. It is in the provisioning tree that users are able to specify which WAN links are assigned to which service and how much of the WAN links the services are entitled to utilize.

The tree structures used by the GUI allows a user to open arbitrary parts of the tree nearly simultaneously. Viewing, adding, deleting, and editing objects is done within the tree itself. This approach allows users to, for example, edit WAN links on one site while viewing the configuration of another site. Branches in the tree structures can contain either additional branches or leaves in the tree. The leaves in the tree each contain an editable section. Editable sections contain parameters that can be edited. For simple items, such as type and model of a site, the editable section is a simple form that contains the parameters that can be edited. For more complex sections, such as rules, the editable section contains more complex widgets like tables, which allow rows to be added, deleted, and edited. When a user opens an editable section of a tree, a JavaScript™ frontend requests, from the UI backend, hypertext markup language (HTML) necessary to render that section.

The object model of the APN configuration has a lot of interrelations between objects. For example, paths depend on the WAN links on both the local and remote sites of the conduit. The relationships mean that a change in one part of the tree may have ramifications to other parts of the tree. The number and variety of interrelation types is addressed by using an architecture that does not require duplicate logic to handle this variability. The architecture allows the user to edit a single section at a time. When the user is finished modifying a section, an apply button is "pushed" to send that change to the server. The server then processes that change by doing a full compile of the configuration that includes this edit to regenerate the object model. The update of the tree in the UI also causes the editable sections to be collapsed. This approach prevents outdated information about the object model from being displayed to the user.

In the case where network objects are renamed, those name changes may need to be propagated to other objects. For example, if a site name changes, then any remote_site_name attributes of add conduit_service statements that reference the old site name must change. The CFGXML component 454 accepts a rename operation, configured with information concerning which renames necessitate changes in other parameters of the configuration, and regenerates the names of dependent objects.

The compiler 434 has the current network's listing of netobjects in the netobjects facility 438. The netobjects hold the actual objects in the configuration and the relations between them. It also has the per object and network wide audits. For example, if a route with service type as Internet is added, but at a local site the Internet service is not configured, then an audit error would occur. In another example, regarding enabling a dynamic conduit on a client site, but in the network, there is no site enabled as an intermediate site, then the dynamic conduit cannot be created and an audit error also would occur. The compiler 434 has the capability to generate registries from the registry output 442 and the listing file from the listing file output 440. The registry generator in the registry output 442 is used in change management on the APNA. An XML output 444 is also added to the compiler. The XML output 444 allows the configuration file to be processed by the compiler 434 and have the netobjects model output as XML to transfer to the UI as a way to view and process all of the objects that are generated in the configuration.

The onboard configuration facility provides an XML output format. The compiler 434 has supported outputting registries and listing files. This capability is implemented by having individual netobjects output in a relevant format and then walking through all the stored netobjects for the proper output. In a current implementation of the compiler 434, a limited amount of XML output is provided for certain objects so that the APN VM database understands what appliances and models are in the configuration. The APN VM architecture requires the compiler 434 to have an XML output 444 that provides a complete representation of the netobjects. The implementation of the XML output 444, takes into account that netobjects store properties that contain a hash data structure which indexes the properties by name. This allows netobjects to be handled in generic way when processing the XML output.

The management plane (MP) configuration (MP_Config) database in datastore 304 contains a mixture of configuration and run-time status information for the APN VM 302. The following objects are defined and stored in this database:

TABLE 12

Objects Stored in MP_Config Database in Datastore 304

| | |
|---|---|
| USERS | a collection of user accounts for the APN VM system |
| AUTH SERVERS | a collection of authentication servers |
| GROUPS | a collection of groups-containing an ID and a name |
| USERS GROUPS | a collection of mappings from user_id to a group_id - membership of users in groups |
| SESSIONS | Store a collection of active user sessions. These are created when a user logs into the APN VM system |
| WORKSPACES | Store the information used to identify a workspace - entries for each workspace created by the APN VM users |
| PREFERENCES | Store key/value pairs - indexed by an ID and a user id - allowing for storage and retrieval of preference information on a per-user basis |
| GLOBAL PREFERENCES | Store key/value pairs - allowing for global preferences to be stored in the system. Many of the APN VM configuration screens store their information in this table using unique keys to identify the stored values |
| WORKSPACE PREFERENCES | Store key/value pairs indexed by workspace_ids - allowing for custom preferences to be stored for each workspace |
| DASHBOARDS | Store information for each of the dashboards created by the users of the APN VM system |
| WIDGETS | A collection of dashboard display items. These can be views of data or tiles |
| DATA VIEWS | A collection of the data views - correlating a view set to a graphical view of that view set. The individual objects define what data objects and properties are to be viewed, and the view set it points to define the time range |
| VIEW SETS | A collection of information describing a time range and a name describing a collection of data to be viewed |
| MANAGED APNs | Store information for each of the APNs currently being monitored by the APN VM |
| MANAGED APPLIANCES | Store information for each of the appliances currently discovered and managed by the APN VM system |
| SITE CONNECTIVITY | Store information showing how sites are inter-connected |
| UNMANAGED CONFIG DOWNLOADS | Store the state of file transfers for configuration file downloads |
| APPLIANCE SETTINGS UPLOADS | Store state of file transfers for appliance settings functionality |
| ACTION STATUSES | This table is used to store the transfer/update status information when transferring files to/from appliances |
| ACTION STATUS STATE | This table is an enumeration containing state values for the actions. |
| STORAGE STATES | This table is used to store the latest state for the different storage and database events. |
| STORAGE STATE VALUES | This table is an enumeration containing state values for the storage states. |

Figure 5A:
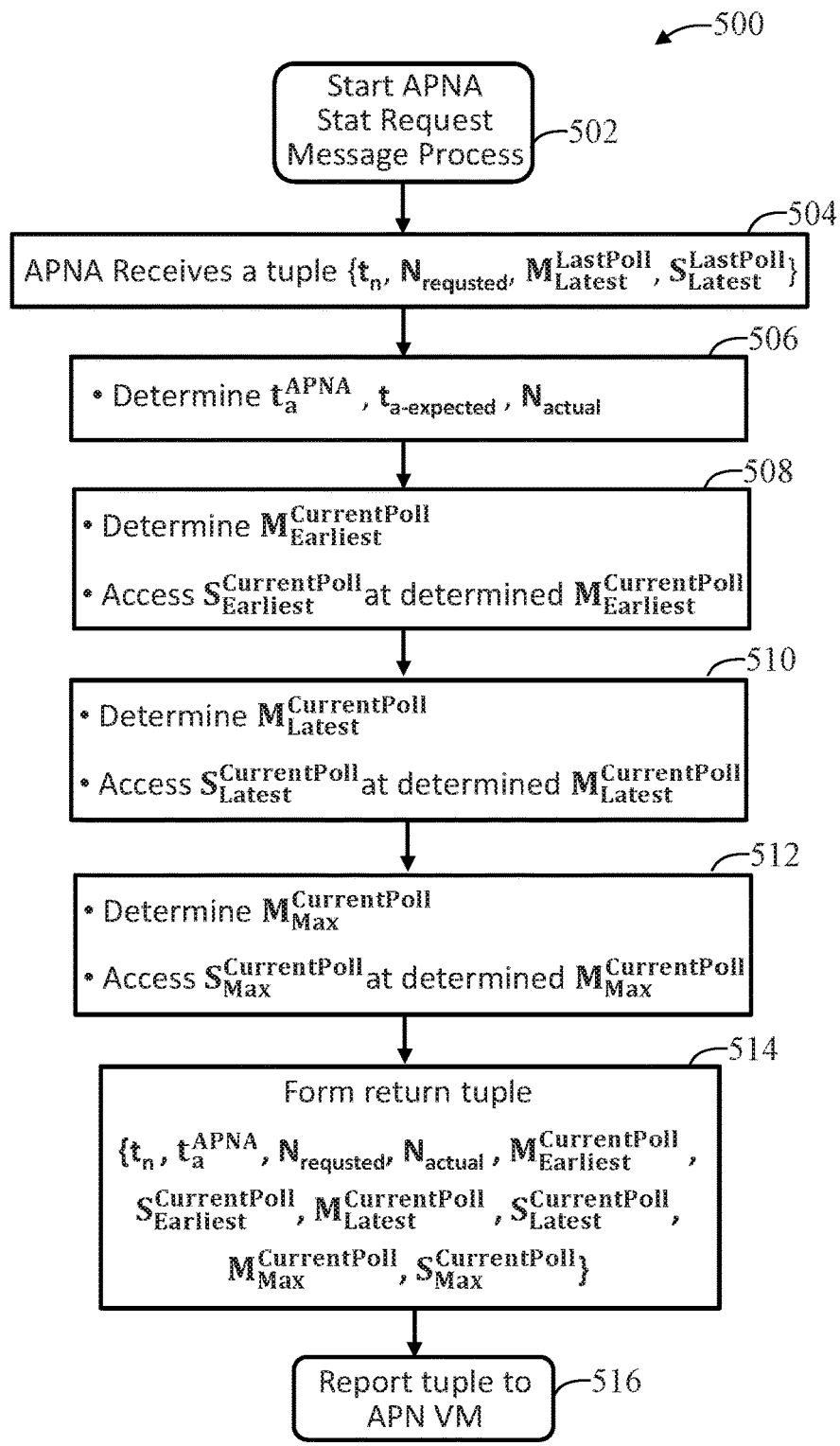
FIG. 5A illustrates a statistic (stat) request message process in accordance with an embodiment of the present invention.
Figure 5B:
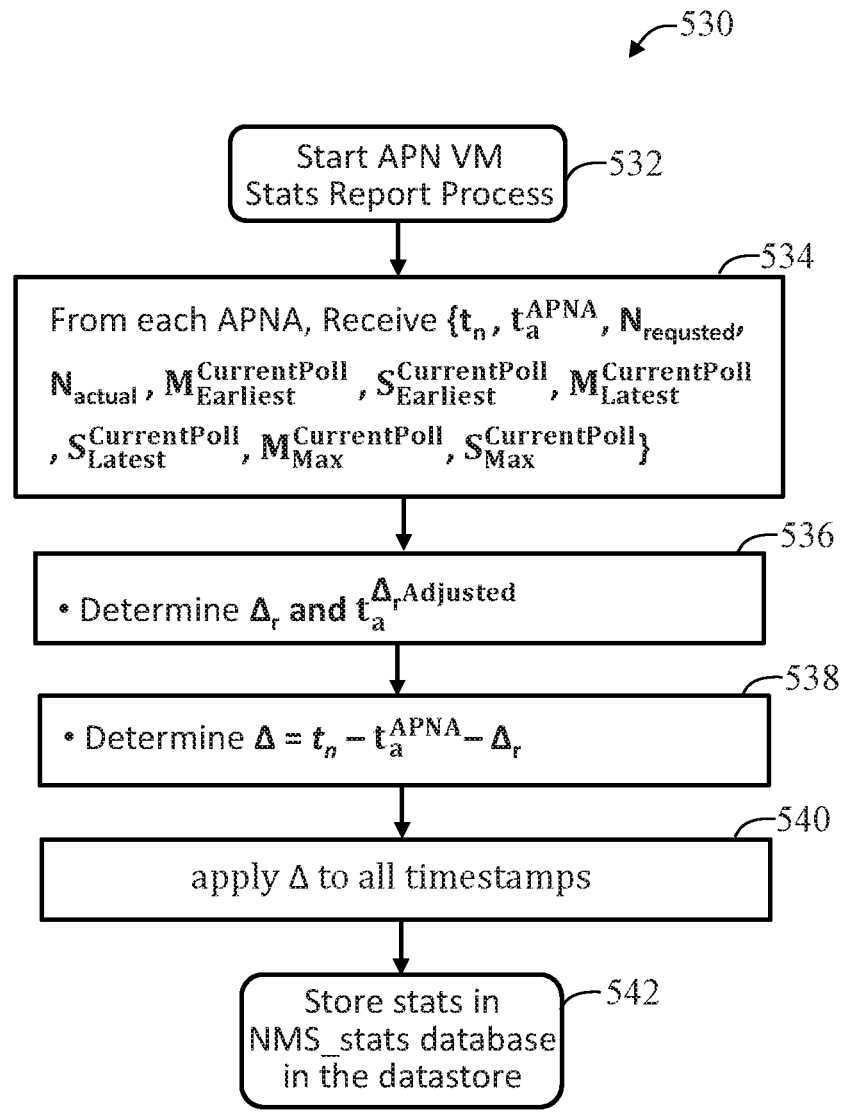
FIG. 5B illustrates a statistic (stat) report process in accordance with an embodiment of the present invention.

FIG. 5A illustrates a statistic (stat) request message process 500 in accordance with an embodiment of the present invention. At step 502, an APNA stat request message process is started. At step 504, a tuple $\{t_n, N_{requested}, M_{Latest}^{LastPoll}, S_{Latest}^{LastPoll}\}$ is received in an APNA. At step 506, the APNA determines $t_a^{APNA}$, $t_{a\text{-}expected}$, and $N_{actual}$. At step 508, the APNA determines $M_{Earliest}^{CurrentPoll}$ and accesses $S_{Earliest}^{CurrentPoll}$ at determined $M_{Earliest}^{CurrentPoll}$. At step 510, the APNA determines $M_{Latest}^{CurrentPoll}$ and accesses $S_{Latest}^{CurrentPoll}$ at determined $M_{Latest}^{CurrentPoll}$. At step 512, the APNA determines $M_{Max}^{CurrentPoll}$ and accesses $S_{Max}^{CurrentPoll}$ at determined $M_{Max}^{CurrentPoll}$. At step 514, the APNA forms a return tuple comprising $\{t_n, t_a^{APNA}, N_{requested}, N_{actual}, M_{Earliest}^{CurrentPoll}, S_{Earliest}^{CurrentPoll}, M_{Latest}^{CurrentPoll}, S_{Latest}^{CurrentPoll}, M_{max}^{CurrentPoll}, S_{max}^{CurrentPoll}\}$. At step 516, the return tuple formed in step 514 is return to APN VM 302.

FIG. 56 illustrates a statistic (stat) report process 530 in accordance with an embodiment of the present invention. At step 532, an APN VM 302 stats report process is started. At step 534, from each APNA, the APN VM 302 receives the return tuple formed in step 514 of FIG. 5A. At step 536, the APN VM 302 determines $\Delta_r$ and $t_a^{ArAdjusted}$. At step 538, the APN VM 302 calculates $\Delta = t_n - t_a^{APNA} - \Delta_r$. At step 540, the APN VM 302 applies A to all timestamps. At step 542, the APN VM 302 stores the received and calculated stats in the NMS_stats database in the datastore 304.

Figure 6:
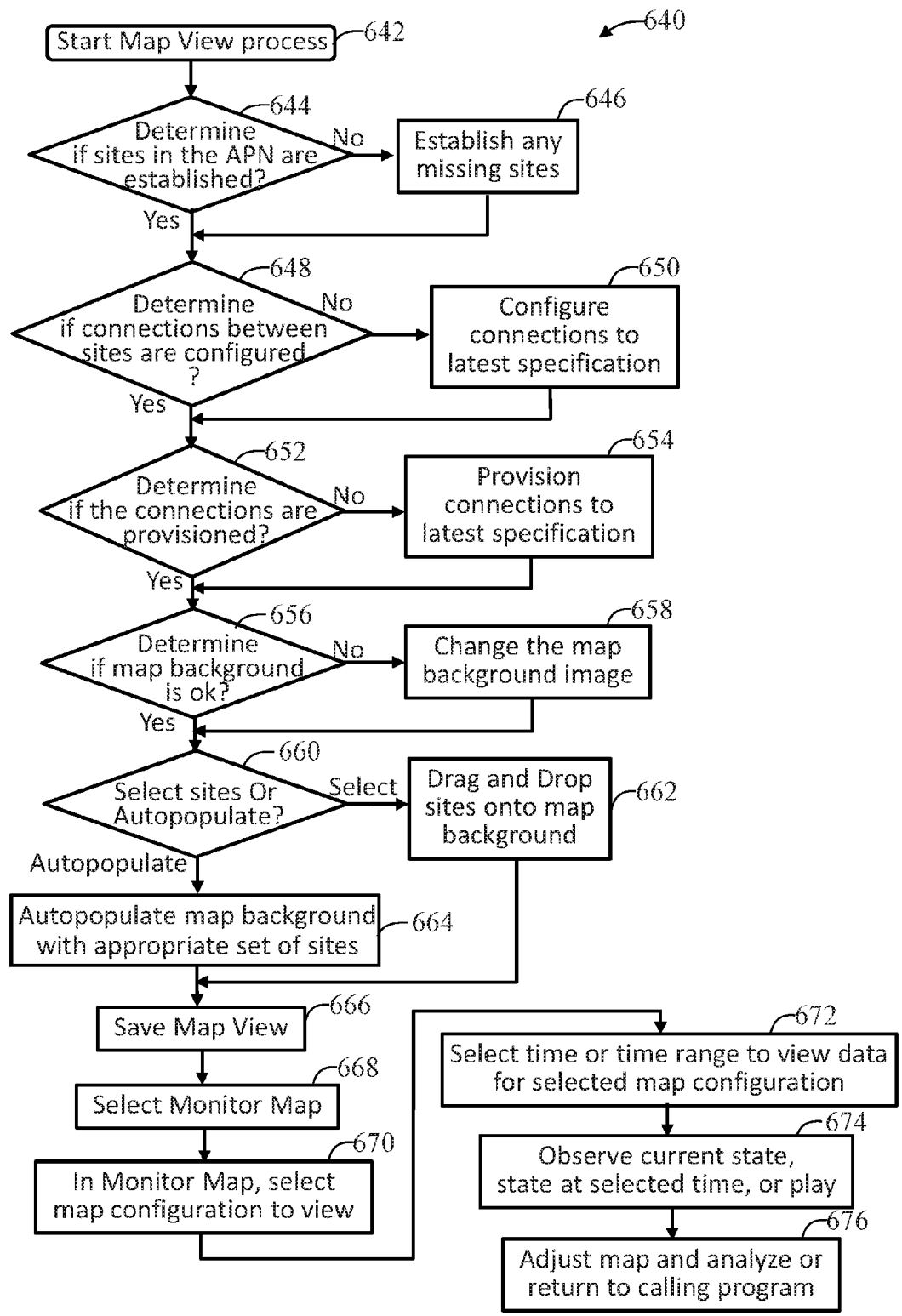
FIG. 6 illustrates a map view process in accordance with an embodiment of the present invention.

FIG. 6 illustrates a map view process 640 in accordance with an embodiment of the present invention. The map view process 640 begins at step 642, such as when a program calls the map view process. At step 644, a determination is made whether sites in an adaptive private network (APN) are established that are to be monitored, analyzed, and supported by a discovery, timestamp correlation, and database schema migration processes. If sites of the APN are still to be established, the process 640 proceeds to step 646. At step 646, the missing sites are added. The sites tree describes basic parameters of a site, such as the Ethernet interfaces, high availability (HA), site name and model, available WAN links, and IP addressing. At step 648, a determination is made whether connections between the sites are configured. If connections between the sites are not fully configured, the process 640 proceeds to step 650. At step 650, the connections are fully configured to the latest specifications for the APN. The connections tree describes how sites are connected to each other with conduits, the rules and classes for the conduits, and whether the sites connect to the Internet and internal intranets. At step 652, a determination is made whether the connections are properly provisioned. If the connections are not fully provisioned, the process 640 proceeds to step 654. At step 654, the connections are fully provisioned to the latest specifications for the APN. The provisioning tree describes how the services defined in the connections tree are to utilize the bandwidth of the available WAN links. It is in the provisioning tree that users are able to specify which WAN links are assigned to which service and how much of the WAN links the services are entitled to utilize.

At step 656, a determination is made whether the map background is acceptable for viewing the selected sites, connections, and provisioning. If the map background is not acceptable for the view task, the process 640 proceeds to step 658. At step 658, the map background is changed. At step 660, a determination is made whether to select sites to be viewed or to auto-populate the map with sites to be viewed. If sites are to be selected for viewing, the process 640 proceeds to step 662. At step 662, sites are dragged and dropped onto the selected map background. If sites are to be auto-populated, the process 640 proceeds from step 660 to step 664. At step 664, the selected map background is auto-populated with an appropriate set of sites. At step 666, the map view with selected sites is saved.

At step 668, a monitor map is selected. At step 668, a monitor map option is selected. At step 670, in the monitor map, a map configuration is selected to view. At step 672, a specific time or a time range is selected to view data for the selected map configuration. At step 674, the current state of the APN, the state of the APN at the selected specific time, or a play option is selected. Tooltips and select operations may be selected to view additional data. At step 676, based on observations, adjustments to map view parameters may be made or displayed results analyzed, or if the map view process is determined to be completed, the process 640 returns to the calling program.

Figure 7:
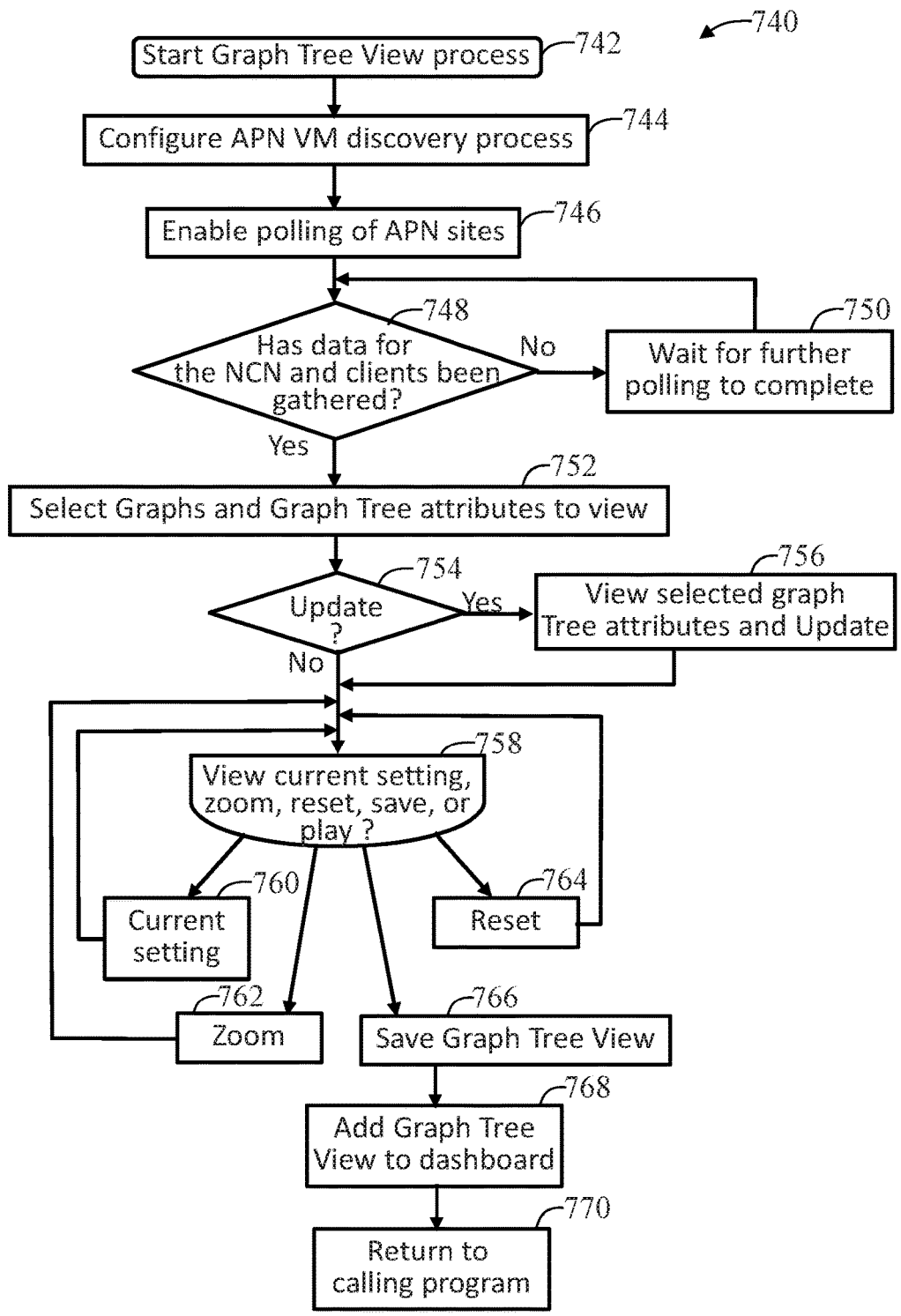
FIG. 7 illustrates a graph tree view process in accordance with an embodiment of the present invention.

FIG. 7 illustrates a graph tree view process 740 in accordance with an embodiment of the present invention. The graph tree view process 740 begins at step 742, such as when a program calls the graph tree view process. At step 744, the APN VM is configured for a discovery process, such as described in steps 644, 646, 648, 650, 652, and 654 of FIG. 6. At step 746, polling of the APN sites is enabled. At step 748, a determination is made whether data for the NCN and client sites have been gathered. If adequate data has not been gathered from the NCN and the client sites in the APN, the process 740 proceeds to step 750. At step 750, the process 740 waits for further polling to complete and returns to step 748. At the point when adequate data has been gathered, the process 740 proceeds to step 752. At step 752, a graph tree view option is selected and graph tree attributes to be viewed are selected. When the selected graph tree attributes are determined to have changed, an update decision may be made. At step 754, if an update is selected, the process 740 proceeds to step 756. At step 756, the selected graph tree attributes are displayed. If no update is selected, prior selected attributes are displayed.

Multiple graph tree attributes are selected to allow the user to see the selected attributes in a graph over time. The graph tree can be viewed to look for trends in data or to compare multiple graph attributes at a time. For example, conduit send/receive bandwidth or loss are graph tree attributes which may be selected. The selection of these two attributes allows the user to analyze the send/receive bandwidth and see if there is a correlation between the loss attribute and the rate attributes when the rate attributes increases.

At step 758, multiple options are presented to view the selected graph tree associated with current settings, to zoom to a sub-range of the selected graph tree, to view the selected graph tree after a reset to an initial time period, to save the selected graph tree settings, or to play the selected graph tree view at multiple time points. If view the current settings is selected, the process 740 proceeds to step 760. At step 760, the current attributes selected are viewed in the graph tree and the process returns to step 758 for further option selection. If the zoom option is selected, the process 740 proceeds to step 762. At step 762, a timeline of attributes are zoomed into a sub-range period to provide a finer view of attribute changes in the selected graph tree for the zoomed in period. The process 740 then returns to step 758 for further option selection. The ability to reset the graph view allows the user to start with a graph looking at a range of times and then zoom into a sub range, and then zoom back out or reset, as described in more detail below, to the original range of time. For example, the user could select to graph a path send/receive bandwidth for all paths that are contained within a given conduit for the month of March. The timeline allows the user to select a finer range such as the Fridays of the month. The user may then want to zoom out or reset the graph view timeline back to viewing the entire month, and then zoom back into a finer range of the first Mondays in the month.

If the reset option is selected, the process 740 proceeds to step 764 and any time period that is currently being viewed is reset back to the initial time period at the beginning of the graph tree view process. The process 740 then returns to step 758 for further option selection. If the save graph tree view is selected, the process 740 proceeds to step 766. At step 766, the graph tree view as currently configured is saved for future viewing. At step 768, the graph tree view is added to a dashboard for ease of selection for future viewing. At step 770, the process 740 returns to the calling program.

Figure 8:
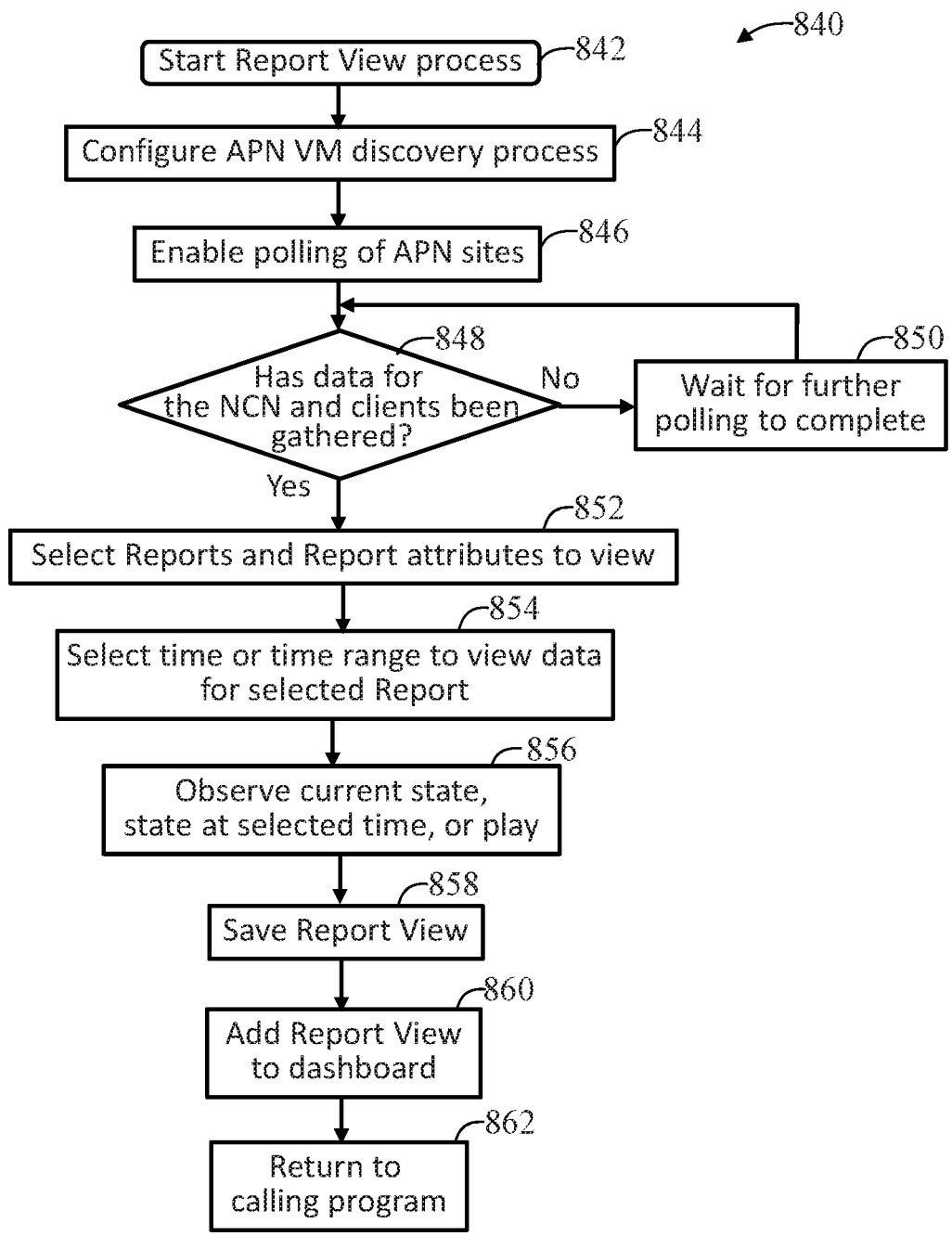
FIG. 8 illustrates a report view process in accordance with an embodiment of the present invention.

FIG. 8 illustrates a report view process 840 in accordance with an embodiment of the present invention. The report view process 840 begins at step 842, such as when a program calls the report view process. At step 844, the APN VM is configured for a discovery process, such as described in steps 644, 646, 648, 650, 652, and 654 of FIG. 6. At step 846, polling of the APN sites is enabled. At step 848, a determination is made whether data for the NCN and client sites have been gathered. If adequate data has not been gathered from the NCN and the client sites in the APN, the process 840 proceeds to step 850. At step 850, the process 840 waits for further polling to complete and returns to step 848. At the point when adequate data has been gathered, the process 840 proceeds to step 852. At step 852, a report option is selected and report attributes to be viewed are selected.

The report attributes allow a user to view multiple attributes at a time for a pre-specified object, such as, a conduit or path for a specific moment in time or a range of time. Multiple reports can be viewed over a period of time to look for trends in data or to compare multiple attributes at once. Examples of report attributes include conduit send/receive bandwidth or loss. From these particular attributes, the user could analyze the send/receive bandwidth and see if there is a correlation between the loss attribute and the rate attributes when the rate attributes increase. The report views are similar to graph tree views except in the way the data is visually displayed. Pre-specified objects include sites, services, conduits, paths, WAN links, classes, applications, Ethernet interfaces, and events, including counts of event types.

At step 854, a specific time or a time range is selected to view data for the selected report and selected map configuration. At step 856, the user views the selected report for the current state of the APN, the state of the APN at the selected specific time, or by use of a play option to play the selected report view at multiple time points. Tooltips and select operations may be selected to view additional data.

At step 858, the report view as currently configured is saved for future viewing. At step 860, the report view is added to a dashboard for ease of selection for future viewing. At step 862, the process 840 returns to the calling program.

Figure 9:
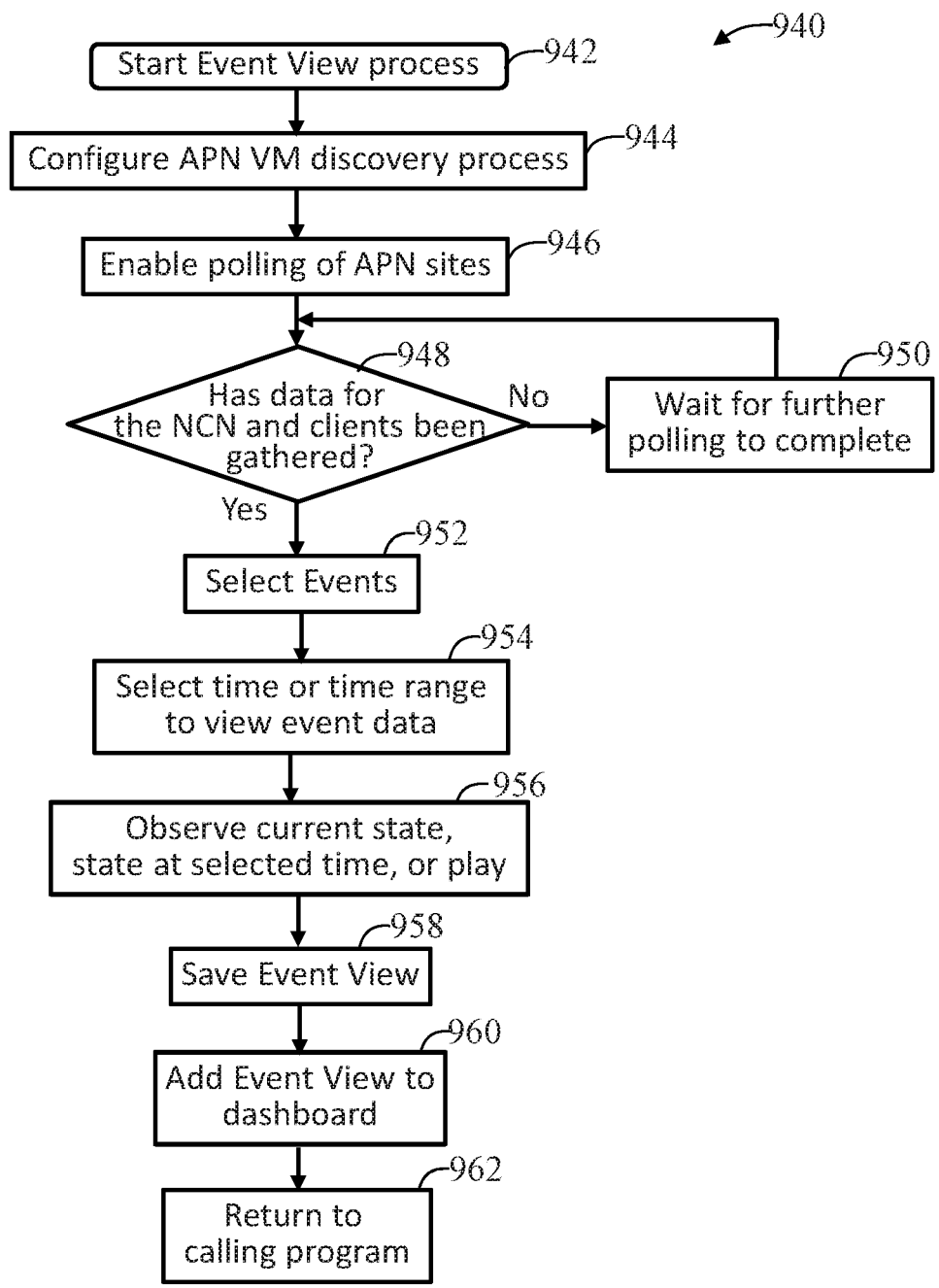
FIG. 9 illustrates an event view process in accordance with an embodiment of the present invention.

FIG. 9 illustrates an event view process 940 in accordance with an embodiment of the present invention. The event view process 940 begins at step 942, such as when a program calls the event view process. At step 944, the APN VM is configured for a discovery process, such as described in steps 644, 646, 648, 650, 652, and 654 of FIG. 6. At step 946, polling of the APN sites is enabled. At step 948, a determination is made whether data for the NCN and client sites have been gathered. If adequate data has not been gathered from the NCN and the client sites in the APN, the process 940 proceeds to step 950. At step 950, the process 940 waits for further polling to complete and returns to step 948. At the point when adequate data has been gathered, the process 940 proceeds to step 952.

At step 952, one or more events are selected. At step 954, a specific time or a time range is selected to view event data for the selected map configuration. At step 956, the user views any selected events that have occurred and associated with the current state of the APN, the state of the APN at the selected specific time, or by use of a play option to play the selected events as they may occur at multiple time points. Tooltips and select operations may be selected to view additional data.

At step 958, the event view as currently configured is saved for future viewing. At step 960, the event view is added to a dashboard for ease of selection for future viewing. At step 962, the process 940 returns to the calling program.

Figure 10:
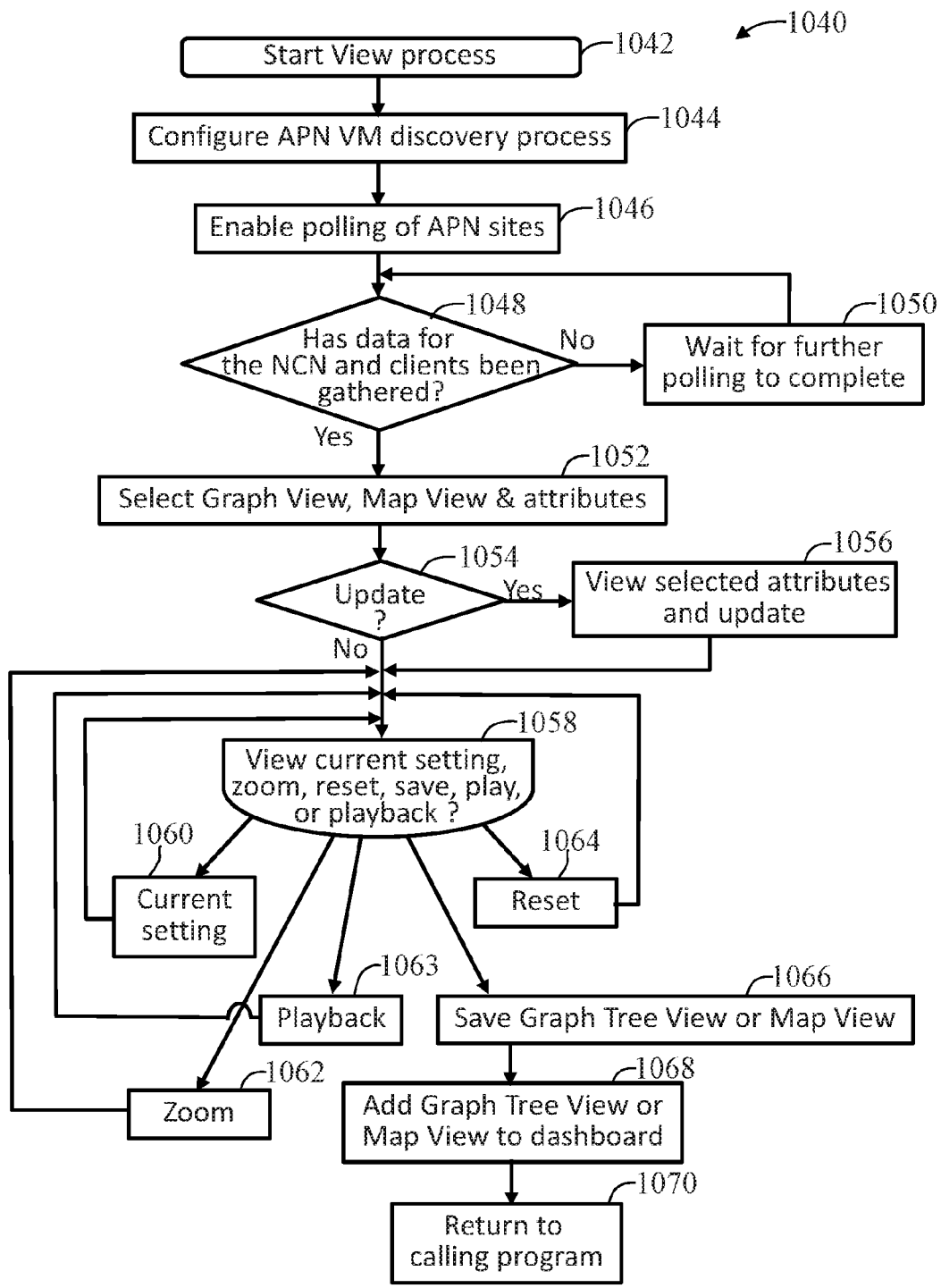
FIG. 10 illustrates a playback process in accordance with an embodiment of the present invention.

FIG. 10 illustrates a playback process 1040 in accordance with an embodiment of the present invention. The view process 1040 begins at step 1042, such as when a program calls the view process. At step 1044, the APN VM is configured for a discovery process, such as described in steps 644, 646, 648, 650, 652, and 654 of FIG. 6. At step 1046, polling of the APN sites is enabled. At step 1048, a determination is made whether data for the NCN and client sites have been gathered. If adequate data has not been gathered from the NCN and the client sites in the APN, the process 1040 proceeds to step 1050. At step 1050, the process 1040 waits for further polling to complete and returns to step 1048. At the point when adequate data has been gathered, the process 1040 proceeds to step 1052. At step 1052, a graph view option or a map view option and appropriate attributes are selected. When the selected attributes are determined to have changed, an update decision may be made. At step 1054, if an update is selected, the process 1040 proceeds to step 1056. At step 1056, the selected attributes are displayed. If no update is selected, prior selected attributes are displayed.

Multiple attributes are selected to allow the user to see the selected attributes in a display over time. A graph tree can be viewed over time to look for trends in data or to compare multiple graph attributes at a time. For example, conduit send/receive bandwidth or loss are graph tree attributes which may be selected. The selection of these two attributes allows the user to analyze the send/receive bandwidth and see if there is a correlation between the loss attribute and the rate attributes when the rate attributes increases.

At step 1058, multiple options are presented to view the selected graph tree associated with current settings, to zoom to a sub-range of the selected graph tree, to view the selected graph tree after a reset to an initial time period, to save the selected graph tree settings, to play the selected graph tree view at multiple time points, or to playback traffic patterns for selected time periods. If view the current settings is selected, the process 1040 proceeds to step 1060. At step 1060, the current attributes selected are viewed and the process returns to step 1058 for further option selection. If the zoom option is selected, the process 1040 proceeds to step 1062. At step 1062, a timeline of attributes are zoomed into a sub-range period to provide a finer view of attribute changes in the selected graph view or map view for the zoomed in period. The process 1040 then returns to step 1058 for further option selection. If the playback option is selected, the process 1040 proceeds to step 1063. At step 1063, the view parameters define what is actually gathered and to be presented. For example, a map view describes sites and conduits to display and a report view describes the objects and attributes to display. Playback is setup by having a user select a time to start the playback and an interval of each update. Once the user starts playback, by clicking a play button for example, the view will advance from the starting time by the interval selected every 1 second and update the display based on the data collected at the new time. For example, if a user selects a start time of 12:00 PM with a 5 minute interval and a 1 second update, the next time displayed will be 12:05 will continue to advance in 5 minute increments every 1 second. Play back stops when there is no more data to display or the user clicks a pause button. It is noted that graph views generally do not have playback capability, since graph views already show data over a period of time.

The ability to reset the graph view allows the user to start with a graph looking at a range of times and then zoom into a sub range, and then zoom back out or reset, as described in more detail below, to the original range of time. For example, the user could select to graph a path send/receive bandwidth for all paths that are contained within a given conduit for the month of March. The timeline allows the user to select a finer range such as the Fridays of the month. The user may then want to zoom out or reset the graph view timeline back to viewing the entire month, and then zoom back into a finer range of the first Mondays in the month.

If the reset option is selected, the process 1040 proceeds to step 1064 and any time period that is currently being viewed is reset back to the initial time period at the beginning of the graph tree view process. The process 1040 then returns to step 1058 for further option selection. If the save graph tree view or map view is selected, the process 1040 proceeds to step 1066. At step 1066, the graph tree view or map view as currently configured is saved for future viewing. At step 1068, the graph tree view or map view is added to a dashboard for ease of selection for future viewing. At step 1070, the process 1040 returns to the calling program.

While the present invention has been disclosed in the context of various aspects of presently preferred embodiments, it will be recognized that the invention may be suitably applied to other environments consistent with the claims which follow.

We claim:

1. A method for presenting traffic patterns between nodes in a network, the method comprising:
sending a request statistics message having a sent time stamp ($t_n$) from a control point to selected nodes in a network;
receiving, in the control point, node statistics from each selected node in the network that include a node time stamp ($t_a$) that marks the receipt of the request statistics message in a selected node;
generating a first delta, ($\Delta_r$), representing a sum of time adjustments in a statistics report for time gaps in the statistics report for each selected node and a second delta based on the first delta to map the node statistics for each selected node to timing in the control point, wherein the second delta is equal to $t_n-t_a-\Delta_r$; and
selectably controlling a presentation of the node statistics for the selected nodes in a direction in time beginning from a specified start time to a specified end time.

2. The method of claim 1 further comprising:
stepping the presentation of the node statistics backward in time, wherein the specified start time is newer in time than the specified end time.

3. The method of claim 2, wherein the presentation of the node statistics is auto-stepped backward in time at a specified interval between steps.

4. The method of claim 1 further comprising:
stepping the presentation of the node statistics forward in time, wherein the specified start time is older in time than the specified end time.

5. The method of claim 4, wherein the presentation of the node statistics is auto-stepped forward in time at a specified interval between steps.

6. The method of claim 1 further comprising:
forming a network map containing the selected nodes of the network and one or more conduits between the selected nodes, wherein each conduit is comprised of one or more network paths between the selected nodes and their allocated WAN link resources; and
graphically presenting the node statistics and state of each conduit at steps in the network map.

7. The method of claim 6, wherein the conduits are color coded having indications including good, bad but usable, and down states.

8. The method of claim 6, wherein the amount of bandwidth is presented by a width of a connection between two nodes.

9. The method of claim 6, wherein creation of dynamic paths and deconstruction of dynamic paths are illustrated in the network map during a time period beginning from the specified start time to the specified end time.

10. The method of claim 1 further comprising:
calculating the first delta according to a previous value of the first delta plus $(t_n-(t_{n-1}+gap))$, wherein $t_{n-1}$ is the time stamp of when the previous request statistics message was sent and the gap is a non-sequential time jump between timing for a current request statistic message and timing for a previous request statistics message.

11. The method of claim 1 further comprising:
applying the first delta to node statistical data to correct for time gaps due to a change in operations in one or more nodes of the selected nodes.

12. The method of claim 1 further comprising:
applying the second delta to the received node statistics for time correlated presentation.

13. A method for presenting traffic patterns during network events, the method comprising:
periodically sending a request statistics message having a sent time stamp ($t_n$) from a control point to selected nodes in a network;
receiving, in the control point, node statistics from each selected node in the network that include a node time stamp ($t_a$) that marks the receipt of the request statistics message in a selected node;
recording an event representing a change in state of a network object associated with one or more of the selected nodes in an event database at the control point;
generating a first delta, ($\Delta_r$), representing a sum of time adjustments in a statistics report for time gaps in the statistics report for each selected node and a second delta based on the first delta to map the node statistics for each selected node to timing in the control point and for storage therein, wherein the second delta is equal to $t_n-t_a-\Delta_r$; and
selectably controlling a presentation of the node statistics for the event associated with one or more of the selected nodes in a direction in time beginning from a specified start time to a specified end time.

14. The method of claim 13 further comprising:
accessing the node statistics at predetermined time intervals from the storage in the control point for the event selected from the event database and for a time period beginning from the specified start time to the specified end time for controlling the presentation at a predetermined rate.

15. The method of claim 13 further comprising:
stepping the presentation of the node statistics backward or forward in time based on whether the specified start time is newer in time than the specified end time or the specified start time is older in time than the specified end time, respectively.

16. The method of claim 15, wherein the presentation of the node statistics is auto-stepped in time at a specified interval between steps.

17. The method of claim 13 further comprising:
calculating the first delta according to a previous value of the first delta plus $(t_n-(t_{n-1}+gap))$, wherein $t_{n-1}$ is the time stamp of when the previous request statistics message was sent and the gap is a non-sequential time jump between timing for current and previous request statistics messages.

18. A computer readable non-transitory medium storing a computer program which causes a computer system to perform a method for presenting traffic patterns between nodes in a network, the method comprising:
sending a request statistics message having a sent time stamp $(t_n)$ from a control point to selected nodes in a network;
receiving, in the control point, node statistics from each selected node in the network that include a node time stamp $(t_a)$ that marks the receipt of the request statistics message in a selected node;
generating a first delta, $(\Delta_r)$, representing a sum of time adjustments in a statistics report for time gaps in the statistics report for each selected node and a second delta based on the first delta to map the node statistics for each selected node to timing in the control point, wherein the second delta is equal to $t_n-t_a-\Delta_r$; and
selectably controlling a presentation of the node statistics for the selected nodes in a direction in time beginning from a specified start time to a specified end time.

19. The computer readable non-transitory medium method of claim 18, wherein timing information is received from the nodes in the network and converted to time at the control point without requiring time synchronization between any nodes in a network.

* * * * *